May 31, 1960 A. H. FAULKNER 2,938,961

ELECTRONIC SWITCHING SYSTEM

Original Filed Jan. 6, 1958 13 Sheets-Sheet 1

INVENTOR.
ALFRED H. FAULKNER
BY
C. A. Gullbrandsen
ATTY.

INVENTOR.
ALFRED H. FAULKNER
BY C. A. Gulbrandsen
ATTY.

INVENTOR.
ALFRED H. FAULKNER
BY C. A. Gilbrandsen
ATTY.

May 31, 1960 A. H. FAULKNER 2,938,961

ELECTRONIC SWITCHING SYSTEM

Original Filed Jan. 6, 1958

13 Sheets-Sheet 4

INVENTOR.
ALFRED H. FAULKNER
BY
C. A. Gullbrandsen
ATTY.

May 31, 1960 A. H. FAULKNER 2,938,961

ELECTRONIC SWITCHING SYSTEM

Original Filed Jan. 6, 1958 13 Sheets-Sheet 5

INVENTOR.
ALFRED H. FAULKNER

BY C. A. Gulbrandsen

ATTY.

May 31, 1960 A. H. FAULKNER 2,938,961

ELECTRONIC SWITCHING SYSTEM

Original Filed Jan. 6, 1958 13 Sheets-Sheet 6

INVENTOR.
ALFRED H. FAULKNER

BY C. A. Gulbrandsen

ATTY.

INVENTOR.
ALFRED H. FAULKNER
BY
C. A. Gulbrandsen
ATTY.

INVENTOR.
ALFRED H. FAULKNER
BY
C. A. Gulbrandsen
ATTY.

May 31, 1960 A. H. FAULKNER 2,938,961

ELECTRONIC SWITCHING SYSTEM

Original Filed Jan. 6, 1958 13 Sheets-Sheet 9

INVENTOR.
ALFRED H. FAULKNER
BY
C. A. Gulbrandsen
ATTY.

INVENTOR.
ALFRED H. FAULKNER
BY
C. A. Gulbrandsen
ATTY.

ELECTRONIC SWITCHING SYSTEM

Original Filed Jan. 6, 1958

13 Sheets-Sheet 11

INVENTOR.
ALFRED H. FAULKNER
BY
C. A. Gulbrandsen
ATTY.

INVENTOR.
ALFRED H. FAULKNER
BY C. A. Gulbrandsen
ATTY.

May 31, 1960 A. H. FAULKNER 2,938,961

ELECTRONIC SWITCHING SYSTEM

Original Filed Jan. 6, 1958 13 Sheets-Sheet 13

INVENTOR.
ALFRED H. FAULKNER

BY C. A. Gulbrandsen

ATTY.

2,938,961

ELECTRONIC SWITCHING SYSTEM

Alfred H. Faulkner, Redondo Beach, Calif., assignor to General Telephone Laboratories, Incorporated, Northlake, Ill., a corporation of Delaware Original application Jan. 6, 1958, Ser. No. 707,298. Divided and this application Feb. 20, 1959, Ser. No. 794,630

3 Claims. (Cl. 179—18)

The invention relates in general to electronic switching systems especially for purposes of telephone communication, and more particularly to a supervisory signal control arrangement in such a system. The present application is a division of my co-pending application Serial No. 707,298, filed January 6, 1958.

Basically the embodiment of the invention herein disclosed is a ten-line electronic telephone system equipped with three links, wherein time division multiplexing is employed for both the voice transmission and control circuits. All of the circuitry is fully transistorized and the subscriber station equipment is conventional, except that tone signalling is used in lieu of the usual ringer.

The principal object of the invention is to provide an improved circuit arrangement for controlling the supervision and signalling of the calling and called lines.

This object is achieved by providing an arrangement including a sequence switch driver for stepping a sequence switch to different output positions, the output signals from the sequence switch being used to control individual signal gate circuits through which different tone signals are coupled for transmisison to the calling line. The sequence switch driver has three inputs. Initiation of a call by a calling line causes a pulse to be transmitted over one of the driver inputs to step the sequence switch to a position in which the output signal opens a signal gate for coupling dial tone to the transmission circuit, and thence to the calling line. At the termination of dialling, the sequence switch is advanced to a position in which the output signal, in conjunction with a busy condition marking circuit, opens a signal gate for coupling busy tone over the transmission circuit to the calling line if the called line is busy.

If the called line is idle, the sequence switch is again advanced to couple ring-back tone to the calling line through a third signal gate.

Answering by the called station causes the sequence switch to be driven to the next position to close the ring-back tone signal gate; and termination of the call causes the sequence switch to be driven to its normal position.

Other objects and features of this invention will be understood from an examination of the following description, taken in conjunction with the accompanying drawings comprising Figs. 1 to 14 wherein.

Figure 2:
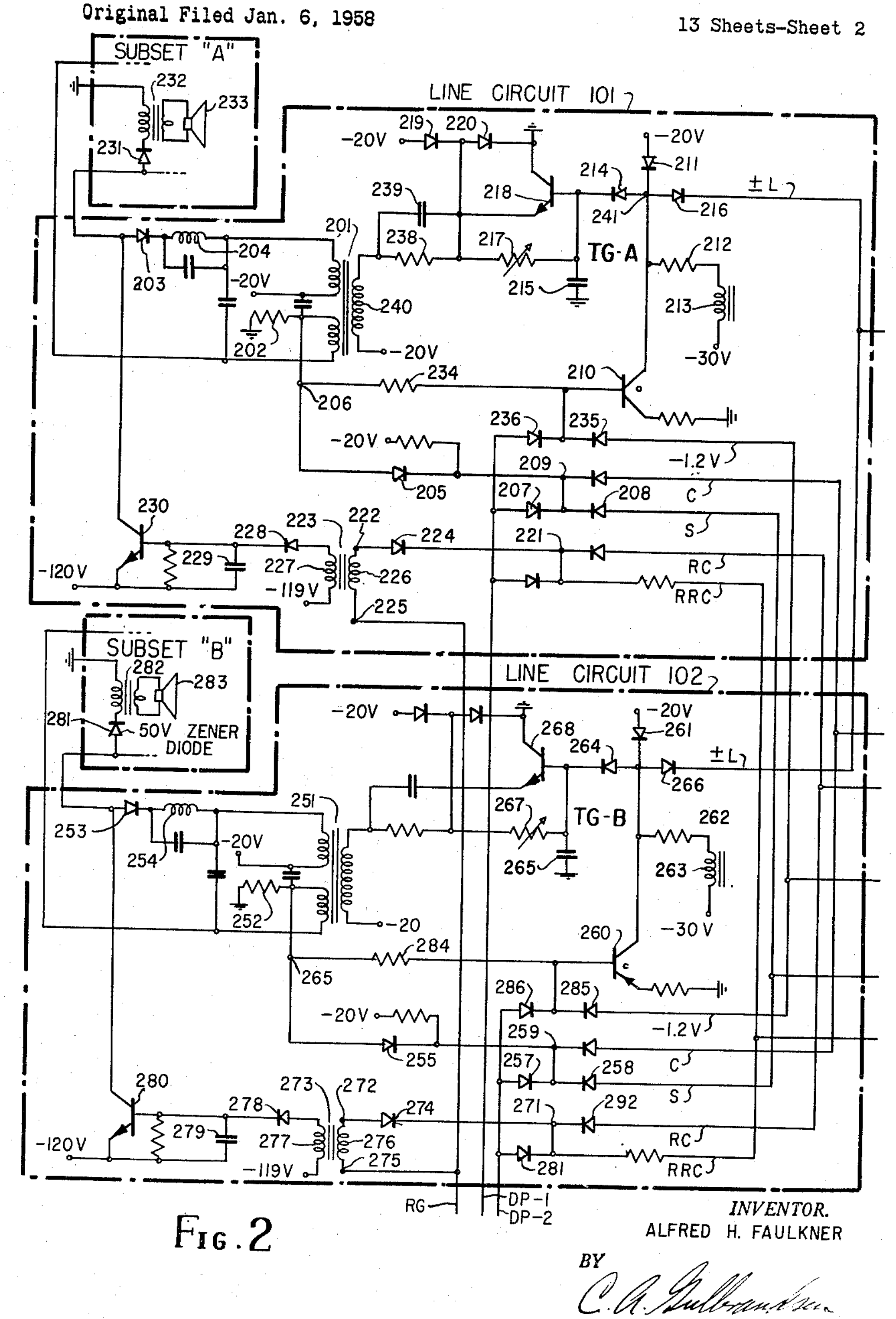
Fig. 2 is a schematic diagram of the two line circuits.
Figures 3, 5, 6:
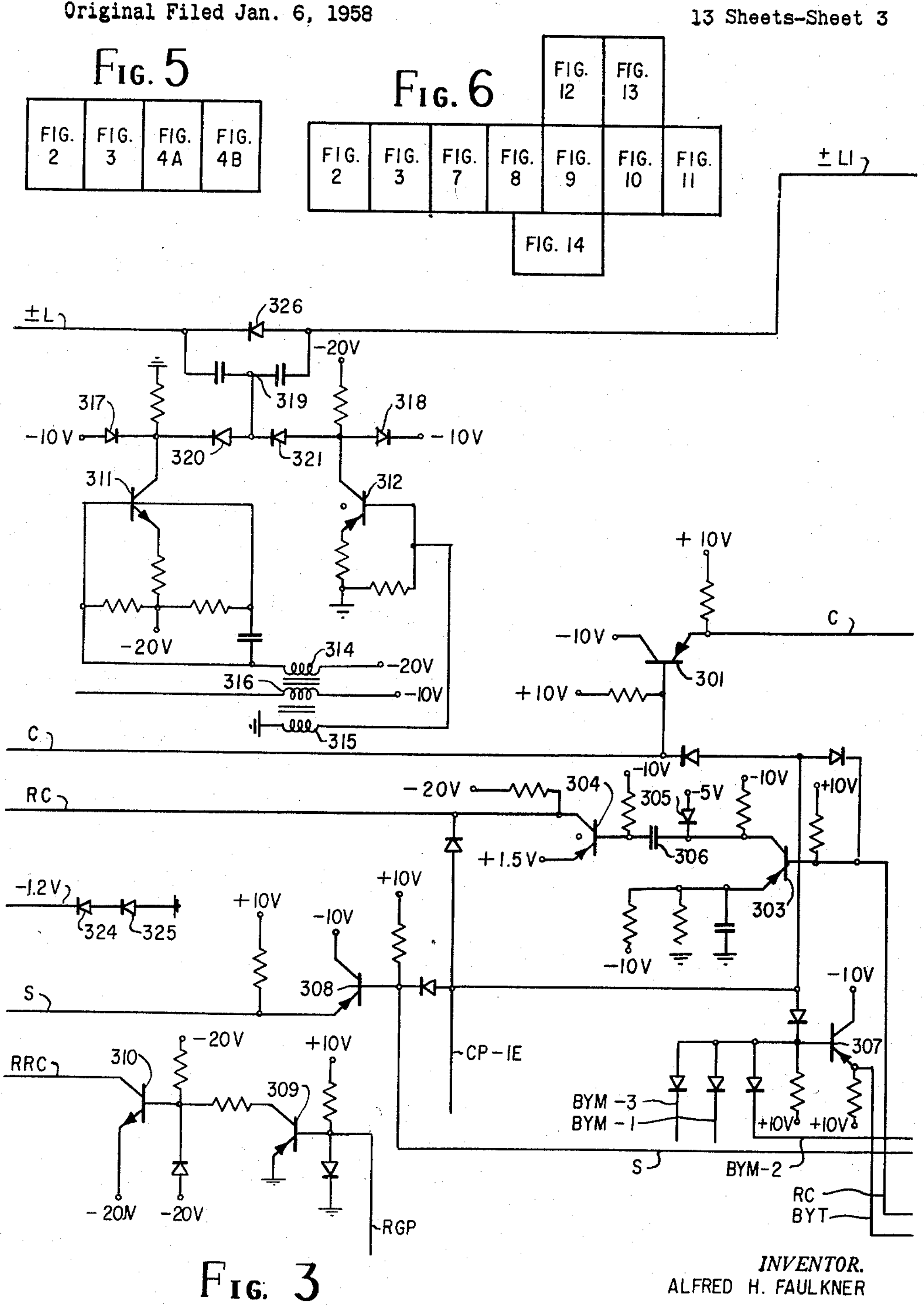
Fig. 3 is a schematic diagram of the line-link common equipment.
Figure 4A:
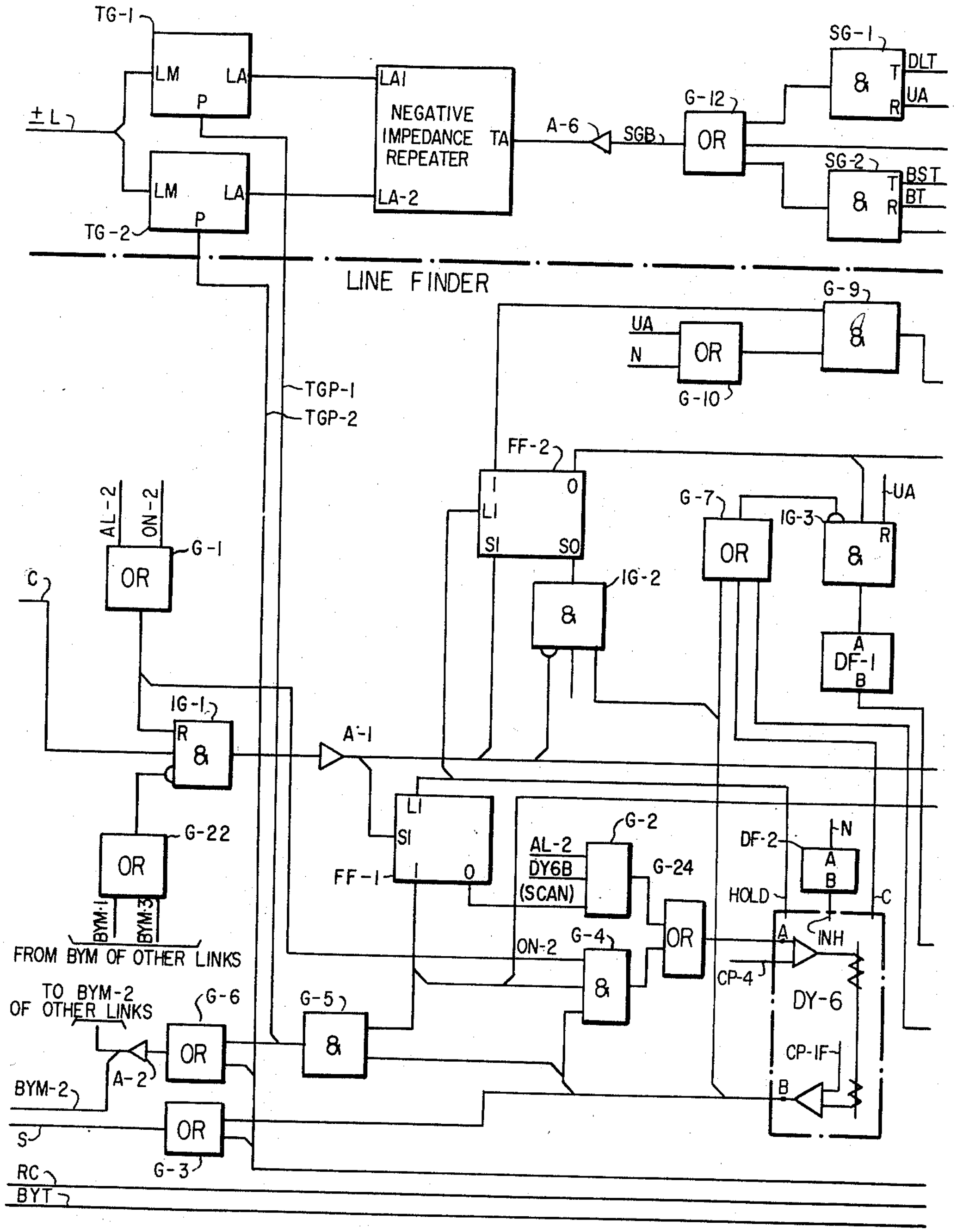
Figure 4B:
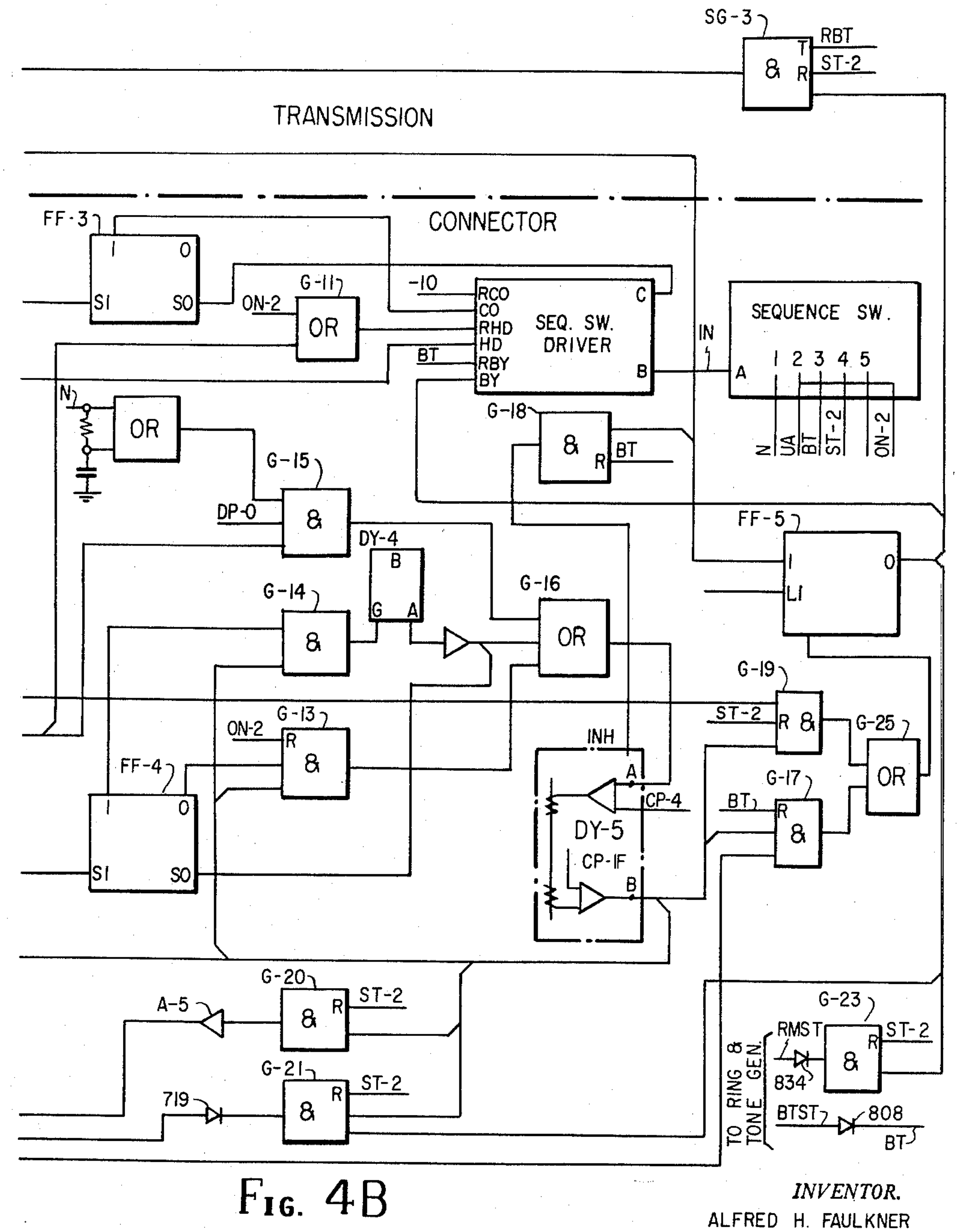

Figs. 4A and 4B comprise a functional block diagram of one of the links;

Fig. 5 shows how Figs. 2, 3, 4A and 4B should be arranged together;

Fig. 6 shows how to arrange Figs. 2 and 3 together with Figs. 7 to 14 to obtain a detailed schematic diagram of two line circuits, a link, and the line-link common equipment, and Figs. 7 to 14 comprise a detailed schematic diagram of the link shown by the functional block diagram of Figs. 4A and 4B.

A. GENERAL OPERATION

This system employs a time division multiplex arrangement having a time slot per line. Each time slot provides two-way transmission between its line circuit and a link. In each link, the line finder and the connector each includes a delay line with an arrangement for coupling the delay-line output and input to circulate pulses. These pulses are used in conjunction with distributor pulses to control the mutliplex transmission, and are also used for various other functions. During a connection, the circulating delay lines of the line finder and the connector deliver output pulses respectively in the time slots of the calling and the called lines.

In operation, one of the idle links is allotted for the next call. Scanning pulses are transmitted through the line finder delay line of the allotted link to the line circuits. Detection of a calling condition on a line causes the delay line of the finder to circulate pulses in the time slot of the calling line, and the corresponding delay line of the connector to circulate pulses in time slot zero.

Conventional dial impulses are transmitted from the calling station to its line circuit, and from there over a multiplex control connection to the link. Each dial impulse causes the circulating pulses in the connector delay line to be advanced one time slot, from zero to one, and then to succeeding time positions; so that at the end of the dialled digit these circulating pulses are in the time slot of the called line.

The busy test, switch through, ringing, and answer then occur in succession. Release of both lines at the termination of a call causes further circulation of pulses in the delay lines of both the finder and connector to be inhibited.

B. GENERAL IDENTIFICATION OF THE SYSTEM

Figure 1:
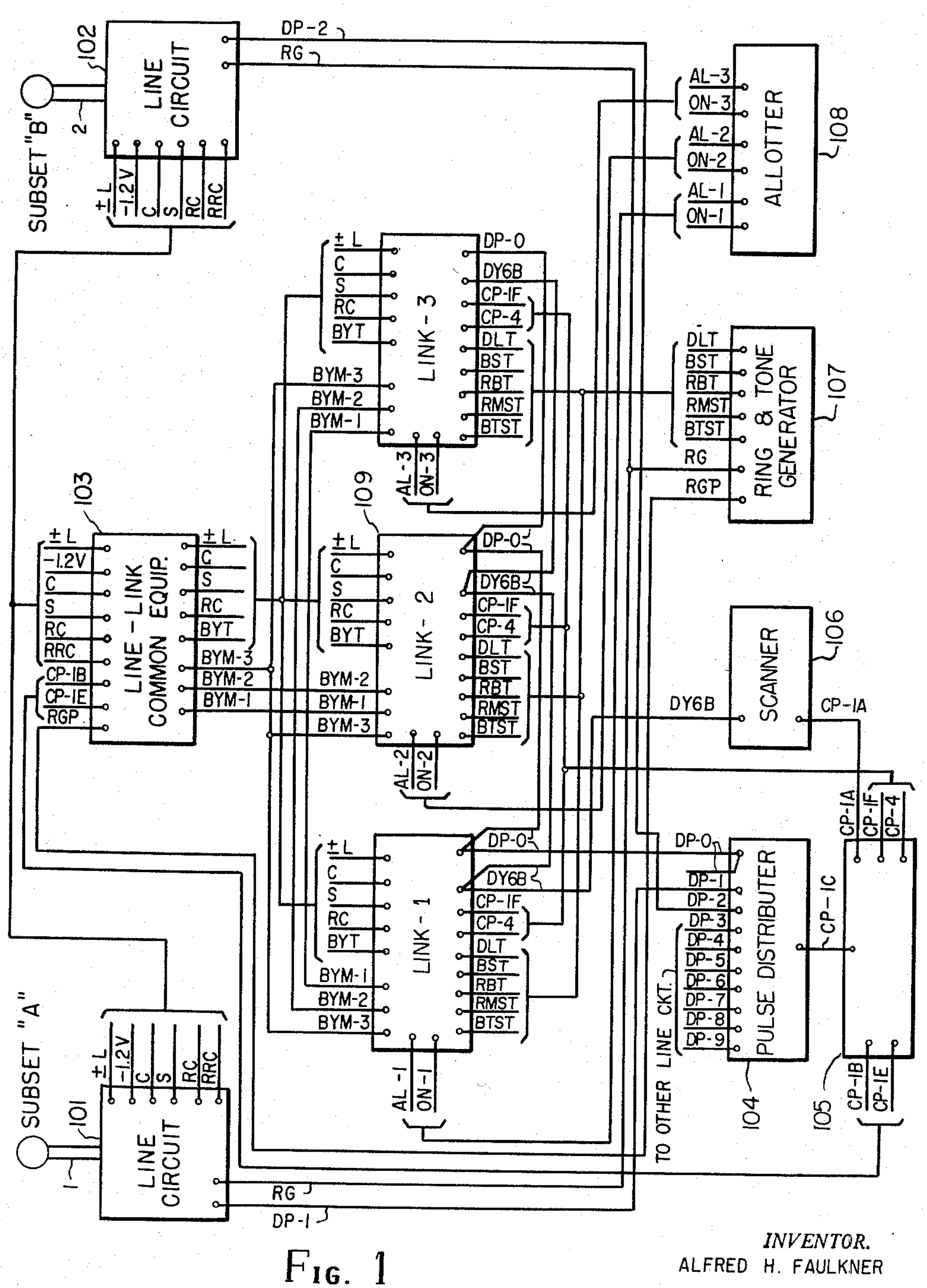
Fig. 1 is a block trunking diagram of the electronic switching system shown herein by way of example, only two of the line circuits being shown.

Fig. 1 shows the entire system except that only two line circuits have been illustrated. The present embodiment of the system is a design for 10 lines although it could be expanded to a greater number within the scope of the invention.

The two line circuits 101 and 102 shown in Fig. 1 are associated with subsets "A" and "B" and connected thereto by lines 1 and 2.

All the line circuits of the system are connected in common to the line-link common equipment as shown, and also in common to lead RG of the ring and tone generator. Each line circuit has a connection individual to itself and connected to the pulse distributor. Thus leads DP–1 to DP–0 are the leads over which each line circuit is assigned its particular time slot in the time division multiplex system.

Lead ±L is the common highway of the system over which intelligence of the system, comprising voice and tone signals, is transmitted. Lead −1.2 v. is used for clamping and, for convenience, the diodes associated therewith are placed in the line-link common equipment. Lead C and lead S are control leads over which a link is seized and dialling occurs. Leads RC and RRC are control leads over which ringing is controlled.

The line-link common equipment 103 performs various functions such as amplifying pulses transmitted between the link and line circuits of the system and also clamps the common highway between pulse periods to prevent cross talk.

Lead RGP is associated with the ring and tone generator and is instrumental in subscriber ringing. Lead BYT and leads BYM-1, BYM-2, BYM-3, which are respectively associated with the three link circuits, are utilized to prevent the calling line from seizing more than one link. Lead CP-1E is utilized to produce sharper pulses on leads C, RC, S, and BYT, and lead CP-1B has a pulse impressed thereon which helps prevent cross talk.

There are three links shown in this system which are identical, each comprising a line finder, a connector and a transmission circuit which controls voice transmission and also introduces dial tone, busy tone and ring-back tone into the transmission system over leads DLT, BST, and RBT respectively.

A signal on lead BTST starts busy tone on the busy tone lead BST. Lead RMST starts the ringing generator in the ring and tone generator circuit. Leads CP-4 and CP-1F shape and synchronize the pulses in the time slots which are admitted to a link circuit. Leads AL-1 to AL-3 and ON-1 to ON-3 are from the allotter and determine which link will be assigned to the next calling subscriber.

The allotter circuit itself is a ring-of-three counting chain arranged to allot a call to an idle link.

The pulse distributor circuit feeds pulses to the line circuits in their assigned time slot over the leads DP-1 to DP-0. Also, lead DP-0 is connected to the links for dialling purposes.

The clock circuit is essentially an oscillator which produces variously spaced pulses which control timing and pulse generating circuits.

The scanner introduces a 1.5 microsecond pulse every 22 microseconds over lead DY6B into the links whereby the links scan the line circuits and test for a calling line.

The ring and tone generator circuit produces dial tone over lead DLT, busy tone over lead BST, and ring-back tone over lead RBT. Leads RG and RGP are utilized to provide ringing to the line circuits.

One of the links is shown in functional block diagram form in Figs. 4A and 4B. The logic gates G-1 to G-25 may be of the type having a diode connected between each input lead and the common output lead, and having a resistor connected from the output lead to a source of D.C. potential; except that in some of the "and" gates this resistor is connected in place of a diode between the output lead and one of the input leads designated R, the D.C. potential being applied from an external source to this input. The "and" gates have ground potential at the output until all the inputs are negative, then the output is negative, and the "or" gates have the output at ground potential until any one input is negative, then the output is negative. The gates IG-1 to IG-3 are "and" gates, except that one of the inputs designated by a semi-circle is an inhibit lead. A negative signal on this inhibit lead blocks negative input pulses at the other inputs from reaching the output.

The signal gates SG-1 to SG-3 pass a tone signal at input T when negative signals are applied simultaneously to the other input leads.

The transmission gates TG-1 and TG-2 control the transmission of signals in both directions between audio at lead LA and time division multiplex at lead LM in a time slot of control pulses applied to terminal P. The negative impedance repeater amplifies signals in both directions between the LA leads, and also couples signals from the lead TA to one of the transmission gates.

Amplifiers are represented by a triangular form.

The differentiating circuits DF-1 and DF-2 are circuits including a series condenser and a shunt resistor for converting a change of potential at the input A to a pulse at the output B.

Each of the flip-flop circuits FF-1 to FF-5 has up to five external connections, leads S0, S1, 1, 0, and L1. Normally a negative potential is present on the lead L1, in which case a pulse on the S1 lead places a negative potential on lead 1 and removes it from lead 0, and conversely a pulse on the lead SO places negative potential on lead 0 and removes it from lead 1. If a negative potential does not appear on lead L1, then the flip-flop cannot be set to have a negative potential on lead 1.

If a pulse of over 20 microseconds duration is placed upon either lead S1 or S0 when the other is at constant potential, the flip-flop will reset itself. That is, a pulse of over 20 microseconds in duration on lead S1 will cause a negative potential to be placed on lead 1 at the beginning of the pulse and ground to be placed on lead 1 at the end of the pulse. However, a differentiating circuit placed in the S1 lead will prevent the flip-flop from resetting itself regardless of the pulse duration. Since the flip-flop circuit is symmetrical, a similar action will occur with a pulse of over 20 microseconds duration on lead S0.

Summarizing for the flip flops, a pulse of less than 20 microseconds in duration on lead S0 causes negative potential to be placed on lead 0, and ground on lead 1 and a pulse of less than 20 microseconds on lead S1 causes a negative potential to be placed on lead 1 and ground on lead 0. This assumes a negative potential on lead L1 which is the normal condition, but if the negative potential does not appear on lead L1, then negative potential cannot appear on lead 1. If a pulse of over approximately 20 microseconds appears on lead S0 or S1 then the flip-flop will reset itself at the end of the pulse.

The circuits DY-2 and DY-5 are magnetostriction delay lines. They comprise a nickel tube with a transmitting coil and a receiving coil wound thereon. A blocking oscillator circuit feeds an electrical impulse to the transmitting coil responsive to an input pulse at terminal A, and an electrical circuit associated with the receiving coil shapes and forms the pulse and transmits it to the output terminal D. The pulses are synchronized by clock pulses applied to the lead CP-4. Delay is obtained by the time required for a mechanical pulse to travel in the nickel tube from the transmitting coil to the receiving coil. Thus, a pulse at input A results in a regenerated pulse at output B delayed a given time.

These magnetostriction delay lines are also provided with auxiliary features. A negative potential on the inhibit lead INH blocks output at B. In delay line DY-2, a negative potential is produced on the hold lead by a train of pulses recirculated in the delay line. A negative potential is placed on lead C during the time that there is a pulse at input A.

Circuit DY-4 is a wire wound electrical delay line having a shield extending the length of the line. The terminals A and B are the opposite ends of the wire, and terminal G is connected to the shield. This is a one microsecond delay line which is open circuited at the terminal B. Therefore, a pulse is reflected to provide a total delay of 2 microseconds.

The sequence switch driver performs the function of generating pulses for advancing the sequence switch. Simultaneous −10 volt input signals on hold lead HD and resistance input to hold gate RHD causes −10 volt pulses delayed an interval of T1 microseconds on terminal B and simultaneously −5 volt pulses on lead C to be generated. Similar delayed pulses, delayed by intervals of T2 and T3 microseconds are generated when −10 volts is applied simultaneously to changeover leads CO and RCO or busy test leads BY and RBY. The time duration T1 is greater than T2 which is greater than T3.

The sequence switch circuit has five steady state conditions and it is in its home or normal position when negative potential appears on lead N. An input pulse on lead A causes the negative potential condition to advance to lead UA and a subsequent pulse on lead A will cause the negative potential condition to advance to lead BT and so on until it reaches its home position again and the cycle has been completed. When the negative potential condition is advanced to lead UA, there is also a negative potential condition on lead ON and that condition remains there as long as the circuit is not in its home or normal position.

For schematic diagrams and a detailed description of all of the circuits of the system, reference may be made to the parent application.

C. OVERALL OPERATION OF THE SYSTEM

*C1. Seizure of a calling line*

The operation of the system will be described with reference to Figs. 2, 3, 4A, and 4B, which should be arranged as shown in Fig. 5. The common equipment, including the pulse distributor, clock, scanner, ring and tone generator, and allotter, are not shown, but leads which are associated with any of these circuits are so marked.

Functional symbols are employed to describe the operation of the link circuit while the details of the line circuits and line-link common equipment are shown.

Let us assume that the allotter has assigned link 2 to to be seized by the next calling party. A potential of −10 volts then appears on lead AL–2. The scanner places a negative output pulse on lead DY6B every 22 microseconds. Flip-flop FF–1 (Fig. 4A) is in its "flop" position which means that the 0 lead of FF–1 will have −10 volts thereon, it being assumed that the normal position is the "flop" position. Therefore, it can be seen in Fig. 4A at gates G–2 and G–24 that a pulse will be gated through to lead A of delay line DY–2 every 22 microseconds. This pulse is of the same shape and phase as the pulse on lead DY6B.

This pulse is fed into delay line DY–2 and emerges 20 microseconds later at lead B of delay line DY–2. This pulse is fed through gate G–3 to lead S, therefrom into the line-link common equipment and into the base of transistor 308 which is an impedance matcher, and from there the pulse travels to all the line circuits over lead S but with no effect at this time. As can be seen, one line circuit is scanned every 22 microseconds, or in other words, a pulse appears in a new time slot every 22 microseconds. Therefore each line circuit is simultaneously pulsed by the pulse-distributor and the scanner only once every 220 microseconds or 4550 per second.

The pulse distributor sends a pulse to each line circuit in its time slot every 20 microseconds. The remainder of the pulses on leads DP–2 to DP–0 are the same but only 2 microseconds apart.

Even when a pulse appears on lead S at the same time that a pulse appears on a DP–N lead, for instance lead DP–1, there will be no effect on the system until the calling party initiates the call. Let us assume that the calling party is at subset "A" which is connected to line circuit 101 by line 1. When the calling party initiates a call, a circuit is completed from ground through resistor 202, a winding on transformer 201, the calling party's line loop, diode 203, inductor 204, and a second winding on transformer 201 to −20 volts. The loop resistance is compensated in the calling party's subset "A" and all other subsets to provide a line circuit of 30 milliamperes. Thus there is a 10 volt drop across resistor 202 which appears across diode 205, biasing it in the reverse direction. Point 209 remains near ground, however, due to the shunt paths through diode 207 and 208 to ground on leads DP–1 and S respectively. Actually there is approximately +1.5 volts on lead DP–1.

When the calling party has initiated the call by closing the subscriber loop circuit and a pulse appears simultaneously on leads S and DP–1, then point 209 swings to −5 volts and transmits a pulse over lead C to the preselected link, which is link 2 in this example. The pulse is sent through an emitter follower amplifier associated with transistor 301 in the line-link common equipment, where impedance matching occurs. From there the pulse is transmitted to inhibit gate IG–1 of link 2.

Since the allotter has preselected link 2, −10 volts appears on lead AL–2, which is gated through gate G–1 to gate IG–1. The gate IG–1 therefore opens when the first pulse arrives on lead C and that pulse is fed to amplifier A–1, and from there to flip-flop FF–1, lead S–1. This flips flip-flop FF–1 which removes −10 volts from lead 0 and places −10 volts on lead 1 causing gate G–2 to close. Gate G–4 now opens as a negative voltage is placed on lead ON–2, as will be seen later, and on lead 1 of flip-flop FF–1, and also because of the pulse on lead DY2B which is the scanning pulse just described.

Therefore the pulse on DY2B is fed back to the input lead DY2A through gates G–4, G–24 and a pulse in time slot 1 corresponding to the calling party will circulate in the delay line DY–2.

The recirculation pulses are also sent to gate G–5 which is now opened by these pulses because −10 volts appears on lead 1 of flip-flop FF–1. From gate G–5 the pulses are sent to the calling party transmission gate TG–1. These pulses are also sent through gate G–6 and amplifier A–2 to the busy mark amplifier associated with transistor 307. The pulses which emerge from the busy mark amplifier are fed back to the links over lead BYT to gate G–17 of each link where they are used in testing for a busy called party as will be seen later.

The recirculating pulses, which emerge from amplifier A–2, are also fed to the other links over lead BYM–2 to gate G–22 of the other links, where they are used to block the seizure of the other links by the same calling party.

The recirculating pulses are also sent through gate G–3 to lead S and from lead S to diode 208 where these pulses arrive simultaneously with the pulses on lead DP–1. Thus, the line circuit associated with line 1, or the calling party line, is connected to link 2, since the pulses on leads DP–1 and S thereafter occur simultaneously at 20 microsecond intervals.

The first pulse on lead C which initiated the foregoing also was fed to flip-flop FF–2 lead S–1 where it flipped flip-flop FF–2 thus causing −10 volts to be removed from lead 0 and placed on lead 1 of flip-flop FF–2. This causes a step voltage to be applied through gate G–9 to input S–1 of flip-flop FF–3. Gate G–9 is opened by the step voltage from flip-flop FF–2 because there is a negative voltage on lead N at this time, thus enabling gate G–9 to pass a step voltage.

Flip-flop FF–3 therefore flips and a step voltage is generated at lead 1 of flip-flop FF–3 and applied to input C0 of the sequence switch driver causing it to generate a pulse at each of its outputs, B and C, after a brief delay. The pulse on lead C of the sequence switch driver flops flip-flop FF–3, resetting it. The pulse on lead B of the sequence switch driver is fed to the input A of the sequence switch, and causes the sequence switch to advance from its N or normal position to the UA position. This results in −10 volts being removed from lead N and being placed on lead ON–2, which causes the allotter to advance, and remove −10 volts from lead AL–2. Gates G–4 and IG–1 receive −10 volts through gate G–1 from lead ON–2 in place of lead AL–2.

When flip-flop FF–1 flipped, it also opened gate G–15 to permit pulses on lead DP–0 in the "0" time slot to pass through gates G–15 and G–16 to the input A of delay line DY–5, causing it to generate pulses at its output lead B, which are in the "0" time slot. These output pulses have no effect at this time. Following the brief delay introduced in the sequence switch driver, the sequence switch transferred −10 volts from lead N to lead ON–2, thereby closing gate G–15 and opening gate G–13 to complete a recirculating path from output lead B of delay line DY–5 to the input A of delay line DY–5 through gates G–13 and G–16. Therefore delay line DY–5 continues to generate pulses at output B in time slot "0" independently of the pulse distributor lead DP–0.

With the sequence switch in position UA, −10 volts is applied to the signal gate SG–1 enabling the signal gate SG–1 to transmit dial tone from lead DLT through gate G–12 and amplifier A–6 to the negative impedance repeater and thence through the transmission gate TG–1 to the calling party's line over the voice transmission common highway lead ±L. The link is now prepared to receive dial impulses.

*C2. Dialling*

When the calling party dials and the calling line is opened by the dial impulses, the point 209 is clamped to ground through diode 205 and resistor 202, thus interrupting the train of pulses on lead C in time slot 1 for the duration of the dial impulse. In the absence of these pulses, inhibit gate IG–2 passes the pulses which are on lead B of delay line DY–2 to the input S0 of flip-flop FF–2 causing it to flop which in turn flips flip-flop FF–4 through inhibit gate IG–3 and the differentiating circuit DF–1.

The −10 volts on lead 1 of flip-flop FF–4, when it is in its flipped position, opens gate G–14 to the output pulses of delay line DY–5, and ground on lead 0 of flip-flop FF–4 closes gate G–13 which interrupts the recirculating path previously mentioned. The next output from lead B of delay line DY–5 passes through gate G–14 to delay line DY–4, which is a 2 microsecond delay line, since the pulse travels the length of delay line DY–4 in one microsecond, is reflected at the open-circuited end and returns to the input after a total delay of 2 microseconds. The reflected pulse passes through amplifier A–4 and gate G–16 to the input A of delay line DY–5 to trigger it in time slot "1." The pulse from amplifier A–4 also flops flip-flop FF–4 which opens gate G–13 and closes gate G–14. The recirculating pulse in delay line DY–5 now recirculates in time slot "1" instead of time slot "0."

At the end of the first dial impulse, the calling party's line is closed, and as a result, pulses in the calling party's time slot "1" again appear on lead C. This occurs because point 209 is no longer clamped to ground through diode 205 and resistor 202. These pulses cause inhibit gate IG–2 to block pulses from lead B of delay line DY–2 and the first of these pulses flips flip-flop FF–2 which in turn flips flip-flop FF–3. Flip-flop FF–3 applies −10 volts to input C0 of the sequence switch driver but not long enough to cause the sequence switch driver to operate before the next impulse, if any, of the dialled digit is received.

At the start of the second impulse, the calling party's line is opened, again clamping point 209 to ground and interrupting the pulses on lead C. Flip-flop FF–2 is flopped again to cause the pulse in delay line DY–5 to advance to time slot "2" in the same manner as described for the first dial impulse. Thus the pulse which recirculates in delay line DY–5 is advanced one time slot for each dial impulse.

When flip-flop FF–2 flops at the start of a dial impulse it causes flip-flop FF–3 to flop also, thus preventing operation of the sequence switch driver during the series of impulses because the voltage present at lead C0 of sequence switch driver is not held there long enough to enable the sequence switch driver to generate a pulse at B to advance the sequence switch. Flip-flops FF–2 and FF–3, in turn, flip at the end of each impulse, as described previously.

*C3. Busy test*

Assume that the called party corresponds to the dialled digit "2," and therefore that two dial impulses are received. After the last impulse of the dialled digit has been received, flip-flop FF–3 remains flipped; therefore the sequence switch driver generates a pulse after a brief delay, and advances the sequence switch to its busy test position BT. Then position UA has ground thereon which blocks inhibit gate IG–3, preventing further operation of flip-flop FF–4; and ground on positions UA and N blocks gate G–9 which prevents further operation of flip-flop FF–3.

The voltage on lead BT is applied to input RBY of the sequence switch driver thus preparing the sequence switch driver for busy test. The voltage on lead BT also opens gate G–17 to coincident pulses from lead BYT and delay line DY–5. In the event the called line is busy, a pulse in the called line's time slot will appear on lead BYT coincident with the pulse circulating in delay line DY–5. If this is the case then gate G–17 will open and a pulse will pass through gates G–17 and G–25 and flip flip-flop FF–5. This places −10 volts on lead 1 and ground on lead 0 of flip-flop FF–5. The ground on lead 0 of flip-flop FF–5 is sent to the input BY where it prevents the sequence switch driver from generating a pulse which would advance the sequence switch at this time.

The −10 volts on lead BT enables gate G–18 to pass the step voltage on lead 1 of flip-flop FF–5 to the inhibit input INH to stop the circulating pulses in delay line DY–5. At the same time, the step voltage from flip-flop FF–5, lead 1, opens supervisory gate SG–2 to transmit busy tone to the calling party through gate G–12, amplifier A–6, the negative impedance repeater, and the transmission system to the calling party in the same manner as dial tone. Busy tone appears on lead BST because the −10 volts on lead BT is sent through diode 808 to lead BTST thereby causing the busy tone to be placed on lead BST. Release from a busy condition is similar to release from a completed call condition and is readily ascertained by reference to the section entitled "Release."

*C4. Switch through*

If the called line is not busy there is no output from gate G–17 during the busy test interval. Therefore, −10 volts remains on lead 0 of flip-flop FF–5 and is fed to input BY of the sequence switch driver and this enables the sequence switch driver to generate a pulse, after a brief delay, which advances the sequence switch to its switch-through position ST–2. This action grounds lead BT to prevent further generation of pulses by the sequence switch driver and closes gates G–17 and G–18.

The −10 volts on lead ST–2 permits the pulse circulating in delay line DY–5 to pass through gate G–20, amplifier A–5, gate G–6, amplifier A–2 to lead BYM–2, and back through the busy mark amplifier in the line-link common equipment to the busy mark lead BYT, to mark the called line busy. The pulses from delay line DY–5 emerging from amplifier A–5 also flow through gate G–3 to lead S and to input P of transmission gate TG–2 to prepare a transmission path to the called line circuit.

*C5. Ringing*

The −10 volts on lead ST–2 also opens gate G–21 to pass pulses from lead B of delay line DY–5, through diode 719 to lead RC. The pulses in the called line time slot on lead RC are transmitted through the amplifier in the line-link common equipment associated with transistors 303 and 304 to point 271 in the line circuit 102 associated with the called line, and to all other similar points in the remaining line circuits. The input pulse to the amplifier associated with lead RC is −5 volts, but the output pulse is an 8.5 volt pulse, going from +1.5 volts when the pulse is absent to −7 volts during the time the pulse is on. The −10 volts on lead ST–2 coupled with the −10 volts on lead 0 of flip-flop FF–5 open gate G–23 and through diode 834 place approximately −10 volts on lead RMST. This starts the operation of the ringing generator which causes three different audio tones to be placed in sequence on lead RG. This sequence is repeated three times, followed by a pause of about three seconds before the sequence is started again. Also, current flows over lead RGP from the Ring and Tone Generator during the time that the sequence of tones appears on lead RG.

When the sequence of tones is being fed to the line circuit over lead RG, current flows over lead RGP to transistor 309 in the line-link common equipment and causes transistor 309 to saturate, which in turn causes transistor 310 to saturate, to place −20 volts on lead RRC. Therefore −20 volts is fed to all the line circuits over lead RRC.

For the duration of the coincidence pulses on leads DP–2 and RC, −5 to −7 volts is applied from point 271 to point 272 of transformer 273 through diode 274. Lead RG, which is connected to terminal 275 of transformer 273, is alternately clamped to ground and raised to −10 volts at the ringing frequency rate. Assuming that lead RG is clamped to ground the current flow in winding 276 of transformer 273 increases linearly at a rate determined by the applied voltage and the inductance of winding 276 of transformer 273 reaching 3 to 4 milliamperes by the end of time slot "2."

The secondary winding 277 of transformer 273 is effectively open-circuited at this time since the induced voltage biases diode 278 in the reverse direction because of the winding arrangement of transformer 273.

When the pulse on lead DP–2 expires it clamps point 271 to +1.5 volts through diode 281. The flux in transformer 273 now commences to decay, reversing the voltage induced in its secondary and causing a current to flow through diode 278 and the base-emitter path of transistor 280. The low forward resistance of this circuit beyond the characteristic knee limits the voltage across winding 277 of transformer 273 to between ½ and 1 volt. The flux therefore decays at only one-tenth the rate at which it rose during the input pulse.

The primary voltage is also limited by reason of the nature of the secondary load, hence diode 274 remains reverse-biased. Current flows in the secondary winding 277 of transformer 273 for practically the entire 18 microsecond interval between successive input pulses.

Capacitor 279 smooths the waveform so as to provide a continuous drive to the base of transistor 280. The amplified current from the collector of transistor 280 flows over lead −L and a 50 volt Zener diode 281, in subset "B" to ground through the speaker transformer 282. This current varies in accordance with the ringing signal on lead RG thereby producing an audible signal at subset "B."

The ring back tone is placed on lead RBT and since −10 volts is on lead ST–2, gate SG–3 opens and allows ring back tone to be sent into the transmission system in a similar manner as the dial tone and busy tone previously mentioned.

*C6. Answer*

When the called party answers, the −10 volts developed across resistor 252 by closure of the line loop causes a pulse train to be transmitted over lead C as described above. These pulses arrive at gate G–19 coincident with those from delay line DY–5 and pass through gates G–19 and G–25 to flip flip-flop FF–5. Ground on lead 0 of flip-flop FF–5 closes gate G–21 to block pulses in the called party's time slot from reaching lead RC which causes ringing to be interrupted because diode 292 is not blocked any longer. Ground on lead 0 of flip-flop FF–5 also blocks gate SG–3 which interrupts ring back tone.

*C7. Transmission*

The calling party and the called party are now in a condition permitting a bi-directional exchange of information. The calling party at subset "A" will transmit and receive intelligence to and from the transmission section of the link circuit in its particular assigned time slot and the called party at subset "B" will do likewise in its particular assigned time slot. The intelligence transmitted by the calling party must be stored in the transmission section of the link circuit until the called party's time slot occurs and vice versa.

The transmission gate TG–A in line circuit 101 comprises diodes 214 and 216, a storage condenser 215, a PNP transistor 210, and associated bias circuits. Similarly transmission gate TG–B in line circuit 102 comprises diodes 264 and 266, storage condenser 265, transistor 260, and bias circuits. The transmission gates TG–1 and TG–2 in the link are similar, except that the transistors are NPN type, the diodes are poled in the opposite directions, and the biasing is different. Pulses in each case are applied to the base of the transistor to open the gate.

Referring particularly to the transmission of intelligence between the calling party's line circuit and the link transmission gates TG–A in the calling party's line circuit and TG–1 in the link circuit are pulsed open simultaneously during the calling party's time slot. The intelligence transmitted to the link during the calling party's time slot is stored until transmission gates TG–B in the called party's line circuit and TG–2 in the link circuit are simultaneously opened during the called party's time slot, thus enabling the intelligence stored in the link to be sent to the called party, and this is repeated 50,000 times each second. The operation of the transmission circuit in the opposite direction of transmission is similar.

*C8. Release*

In the event that the called party disconnects first, the pulses on lead C in the called time slot are blocked in a manner which has been explained. However, pulses in the calling time slot remain on lead C because they circulate over leads S and C through the calling line circuit. Thus there is no effect on the link circuit at this time. When the calling party subsequently disconnects, the pulses on lead C in the calling time slot are also blocked. This causes flip-flop FF–2 to flop, because a pulse from delay line DY–2 on lead B is passed through inhibit gate IG–2 (because of the lack of coincidence of pulses in time slot "1" or the calling party's time slot) to input S0 of flip-flop FF–2. There now appears a −10 volts on lead 0 of flip-flop FF–2. The −10 volts on lead 0 of flip-flop FF–2, which is fed to input HD of the sequence switch driver, and the −10 volts on lead 1 of flip-flop FF–1 which is passed through gate G–11 to input RHD of the sequence switch driver, enable the sequence switch driver to generate two pulses which advances the sequence switch to its normal or N position. The −10 volt step voltage on lead N is applied to differentiating circuit DF–2, to produce a brief pulse on the inhibit input INH of delay line DY–2 to block the pulses circulating therein. The HOLD lead of delay line DY–2 then restores from −10 volts to ground. The removal of −10 volts from the HOLD lead of delay line DY–2 flops flip-flop FF–1 and maintains it flopped and also maintains flip-flop FF–2 flopped. Flip-flops FF–1 and FF–2 are incapable of being operated until −10 volts appears at the HOLD lead of delay line DY–2 which occurs when pulses are sent through the delay line when the link is again selected for a call by the allotter.

The absence of −10 volts from lead 1 of flip-flop FF–1 plus the absence of −10 volts from lead ON–2 of the sequence switch, blocks gate G–11 and thereby removes −10 volts from input RHD of the sequence switch driver, thus preventing the generation of another pulse and thereby maintaining the sequence switch in its N or normal position.

With an absence of −10 volts on lead ON–2, gate G–13 is blocked, thus blocking the recirculation of pulses in delay line DY–5 and also flops flip-flop FF–5 and maintains it so. All gates, which were opened during switch-through, are now closed.

In the event that the calling party disconnects first, the pulses on lead C in the calling time slot are blocked while those in the called time slot remain. In the absence of a coincident pulse on lead C, inhibit gate IG–2 passes pulses from delay line DY–2, lead B, to lead S0 of flip-flop FF–2 causing it to flop. But flip-flop FF–2 is flipped by the next pulse on lead C in the called time slot, hence it oscillates at 50,000 cycles per second having −10 volts on lead F at least ten percent of the time depending on the particular time slots involved in the established connection. As long as flip-flop FF–2 continues to oscillate between its flip and flop positions the sequence switch driver is not given time to generate a pulse and hence the link is held by the called line. When the called party subsequently disconnects, flip-flop FF–2 is no longer flipped by pulses on lead C and the release is effected in the same manner as previously described.

Release from a busy condition is similar to what has previously been described. When the calling party disconnects, flip-flop FF–2 flops from a pulse from lead B of delay line DY–2 which is passed through inhibit gate IG–2 to input S0 of flip-flop FF–2. This places −10 volts at input HD, which combined with the −10 volts placed on RHD, causes the sequence switch driver to generate three pulses and advance the sequence switch to its N or normal position in a manner understood by reference to the previous parts of this section.

D. DETAILED DESCRIPTION

The portion of the system illustrated by the figures arranged as shown in Fig. 5 for explaining the overall operation, is illustrated with detailed schematic drawings by the figures arranged as shown in Fig. 6.

*D1. Subsets "A" and B"*

The subsets which terminate the various lines of the system are identical and well-known in the art with the exception that tone signalling is used in lieu of the usual ring.

There is illustrated in Fig. 2 two subsets; subset "A" which terminates line 1; and subset "B" which terminates line 2. The only parts of either subset which are shown are the 50 volt Zener diodes 231 and 281, the loudspeaker audio transformers 232 and 282 and the loudspeakers 233 and 283. All the other equipment is conventional and need not be explained. The Zener diode is a well-known item and need not be explained.

From the above it can be seen that the ringing signal will be an audio tone transformed from electrical energy into sound by the loudspakers 233 and 283.

*D2. Line circuits*

As has been previously stated, the two line circuits 101 and 102 are utilized to terminate the lines 1 and 2. These two circuits as well as the line circuits terminating the other lines of the system, lines 3 to 0, are identical in circuitry and mode of operation. Since both line circuits 101 and 102 are identical in every respect, the following description will be confined to line circuit 101 illustrated in detail in Fig. 2.

When the subscriber at subset "A" connected to line circuit 101 initiates a call a circuit is completed from ground through resistor 202, a winding on transformer 201, the subscriber's line loop, diode 203, inductor 204, and a second winding on transformer 201 to −20 volts. The loop resistance is compensated in the subscriber's subset "A" and all other subsets to provide a line current of 30 milliamperes. Thus there is a 10 volt drop across resistor 202 which appears across diode 205 biasing it in the reverse direction.

Point 209 remains near ground, however, due to shunt paths through diodes 207 and 208 to ground on leads DP–1 and S, respectively. Actually there is approximately +1.5 volts on lead DP–1 from the pulse distributor circuit. The pulse distributor circuit cyclically removes the +1.5 volts for 2 microseconds out of every 20 microseconds, defining time slot 1 allocated to line 1.

Point 209 remains near ground during time slot 1 due to the ground normally on lead S. As has been previously stated when a link is free to answer calls and is selected for use by the allotter it sends out a continuous train of pulses spaced at 22 microseconds intervals on lead S. When such a pulse appears on lead S in coincidence with a similar pulse on lead DP–1, point 209 swings to −5 volts and transmits a pulse over lead C to the scanning link through the line link common equipment.

Upon receipt of such a pulse over lead C the link ceases its scanning operation and thereafter sends a continuous train of pulses in time slot 1 or lead S, these pulses being returned over lead C as long as the loop circuit to subset "A" remains closed.

The −10 volts appearing across resistor 202 is also applied to the base of transistor 210 of gate TG–A through resistor 234. The base of transistor 210 is normally clamped to lead DP–1 and hence approximately +1.5 volts. Thus transistor 210 is cut off except during time slot 1 when the base voltage of transistor 210 becomes −1.2 volts. The base voltage of transistor 210 is clamped to −1.2 volts through diode 235 and two silicon diodes 324 and 325 in series to ground (Fig. 3).

When transistor 210 conducts, a current of 12 milliamperes flows from the collector of transistor 210. A current of 2 milliamperes is normally flowing from −20 volts through diode 211, resistor 212, and inductor 213 to −30 volts. With transistor 210 conducting, this 2 milliampere current is obtained from the collector of transistor 210 since diode 211 will be reverse biased.

The remaining 10 milliamperes flows through diode 214 and discharges capacitor 215 during the first half of the current pulse, then is switched through diode 216 to the common transmission line $\pm L$ for the second half of the pulse. During speech transmission the current is switched earlier or later than the midpoint.

The average voltage across capacitor 215 is −10 volts, the discharge effected by transistor 210 in time slot −1 being partially made up for between pulses by the base input circuit of transistor 218. The base-emitter path of transistor 218 is shunted by variable resistor 217 which is adjusted so as to provide a net current gain of 15 in the emitter follower circuit in which transistor 218 is connected. As a result of this current gain the 1000 ohm line impedance seen looking into transformer 201 is changed to 15000 ohms looking into the base of transistor 218 but without any change in voltage level.

Dial tone is transmitted from the link circuit to the line loop over the common highway $\pm L$ and through this transmission gate, which is explained in detail in the section titled "Transmission," at this time to inform the subscriber that he may proceed to dial.

During dialling excessive voltages would be applied to the transmission circuit due to the rapid decay of flux in transformer 201 upon interruption of the line circuit, if no measures were taken to prevent it. Diodes 219 and 220 limit the voltage applied to the emitter of transistor 218 to values between ground and −20 volts as can be readily observed.

Each time that the line loop is opened by the impulse contacts of the dial, the point 209 is clamped to ground through diode 205 and resistor 202, thus interrupting the train of pulses on lead C in time slot 1 for the duration of the dial impulse. Conduction of transistor 210 is also interrupted but this is inconsequential since there is no need for transmission at this time. The pulses on lead C in time slot 1 are interrupted in like manner when the subscriber hangs up. These interruptions in the pulse train control operations in the link in the manner described previously in the general explanation of the system.

Dial tone, busy tone, ring-back tone, and speech transmission are all sent over the transmission common highway $\pm L$ and through the transmission gate TG–1.

When subset "A" of line 1 is called by another subscriber the ringing generator is started causing —20 volts to be applied to lead RRC during the ringing interval, and a train of pulses in time slot 1 is transmitted over lead RC by the link circuit serving the calling subscriber. For the duration of the coincident pulses on leads DP–1 and RC, —5 to —7 volts is applied from point 221 to point 222 of transformer 223 through diode 224.

Lead RG which is connected to terminal 225 of transformer 223 is alternately clamped to ground and raised to —10 volts at the ringing frequency rate. Assuming that lead RG is clamped to ground, the current flow in winding 226 of transformer 223 increases linearly at a rate determined by the applied voltage and the inductance of winding 226 of transformer 223, reaching 3 to 4 milliamperes by the end of time slot 1.

The secondary winding 227 of transformer 223 is effectively open-circuited at this time since the induced voltage biases diode 228 in the reverse direction because of the winding arrangement of transformer 223.

When the pulse on lead DP–1 expires it clamps point 221 to +1.5 volts through diode 237. The flux in transformer 223 now commences to decay, reversing the voltage induced in its secondary and hence causing current to flow through diode 228 and the base-emitter path of transistor 230.

The low forward resistance of this circuit beyond the characteristic knee limits the voltage across winding 227 of transformer 223 to between ½ and 1 volt. The flux therefore decays at only one-tenth of the rate at which it rose during the input pulse.

The primary voltage is also limited by reason of the nature of the secondary load, hence diode 224 remains reverse biased. Current flows in the secondary winding 227 of transformer 223 for practically the entire 18 microsecond interval between successive input pulses.

Capacitor 229 smooths the waveform so as to provide a continuous drive to the base of transistor 230. The amplified current from the collector of transistor 230 flows over lead —L and a 50 volt Zener diode 231 in subset "A" to ground through the speaker transformer 232. As can be seen this current varies in accordance with the ringing signal on lead RG producing an audible signal at subset "A."

Now when the called subscriber answers, the —10 volts developed across resistor 202 by closure of the line loop permits a pulse train to appear on lead C, which causes the link circuit to interrupt the pulse train on lead RC, thus stopping the ringing.

*D3. Line-link common equipment*

The common equipment shown in Fig. 3 includes circuits associated with leads ±L, C, S, and RC, a circuit associated with lead RGP and RRC for ringing, and a busy mark circuit associated with leads BYM–1, BYM–2, and BYM–3.

The lead C has associated therewith an emitter follower amplifier including transistor 301. The amplifier is biased as a "Class A" emitter follower amplifier and its function is to match the high impedance of the line circuit to the low impedance of the link circuit. The pulse on lead CP–1E is also fed to the base of transistor 301 in order to obtain a fast response. Therefore by this circuit a —5 volt pulse on the input at the base of transistor 301 is translated into a —5 volt pulse at the emitter of transistor 301 but with the desired impedance match.

Turning to lead S therein is an amplifier associated with transistor 308 identical to that on lead C but the input is from the link and the output is to the line circuit. Therefore the high impedance of the link is matched with the low impedance of the line.

The amplifier on the lead RC is a two stage amplifier comprising transistors 303 and 304. It amplifies the pulse amplitude. The input pulse is at —5 volts but the output pulse is an 8.5 volt pulse, going from +1.5 volts when the pulse is absent to —7 volts during the time the pulse is on.

The amplifier, including transistor 307, associated with the busy mark leads BYM–1, BYM–2, BYM–3, and BYT matches the links to each other. The function of the busy mark amplifier in the system has been previously explained in the general description of the system. The amplifier has three inputs any of which will trigger the amplifier. There is also a clock pulse on the lead CP–1E which causes a faster response to a pulse on any of the three input leads. Therefore a negative pulse on either lead BYM–1, BYM–2, or BYM–3, will cause a negative pulse on lead BYT. Since the transistor 307 is used in an emitter follower circuit and a —5 volt pulse is present on the input leads whenever there is a pulse at the input leads it can be seen that the output pulses on lead BYT are —5 volts in amplitude as well.

The ringing gate control amplifier comprises transistors 309 and 310 and has input and output leads RGP and RRC respectively.

In order to cut down crosstalk caused by the common highway lead ±L, a transmission clamp circuit is provided. A pulse on lead CP–1B from the clock circuit is impressed on the primary winding of transformer 313 between transmission pulses. The circuit includes transistors 311 and 312; and diodes 317, 318, 320, and 321. Point 319 is clamped to —10 volts during the time the pulse is on lead CP–1B whether the previous potential was positive or negative. Thus a fixed voltage is maintained on lead ±L for the beginning of each new pulse thereby reducing crosstalk.

*D4. Link*

A functional diagram of a link circuit is shown in Figs. 4A and 4B and it is there shown that the link circuit is composed of three units, the line finder, the connector, and the link transmission circuit.

The functional cooperation of the various sub-units of these three main units of the link in the overall system has been explained and it is the purpose here to describe the sub-units individually. The detailed circuits are in Figs. 7 to 14.

*D4a. Circuits of similar character*

Some of the circuits found in various parts of the link are of a similar character and are explained under common headings before the three parts of the link.

*D4a1. Magnetostriction delay lines DY–2 and DY–5*

Figure 12:
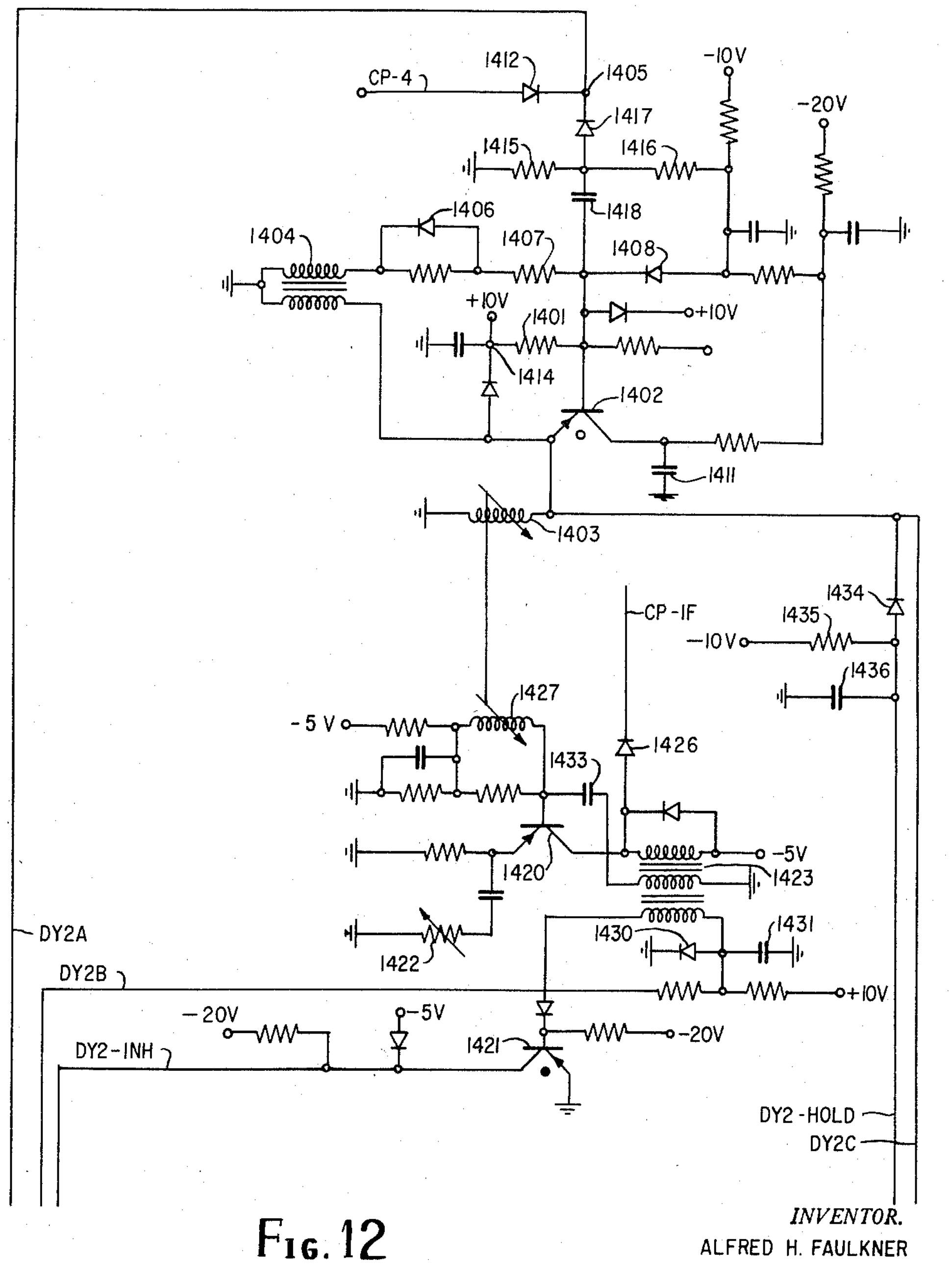
Figure 13:
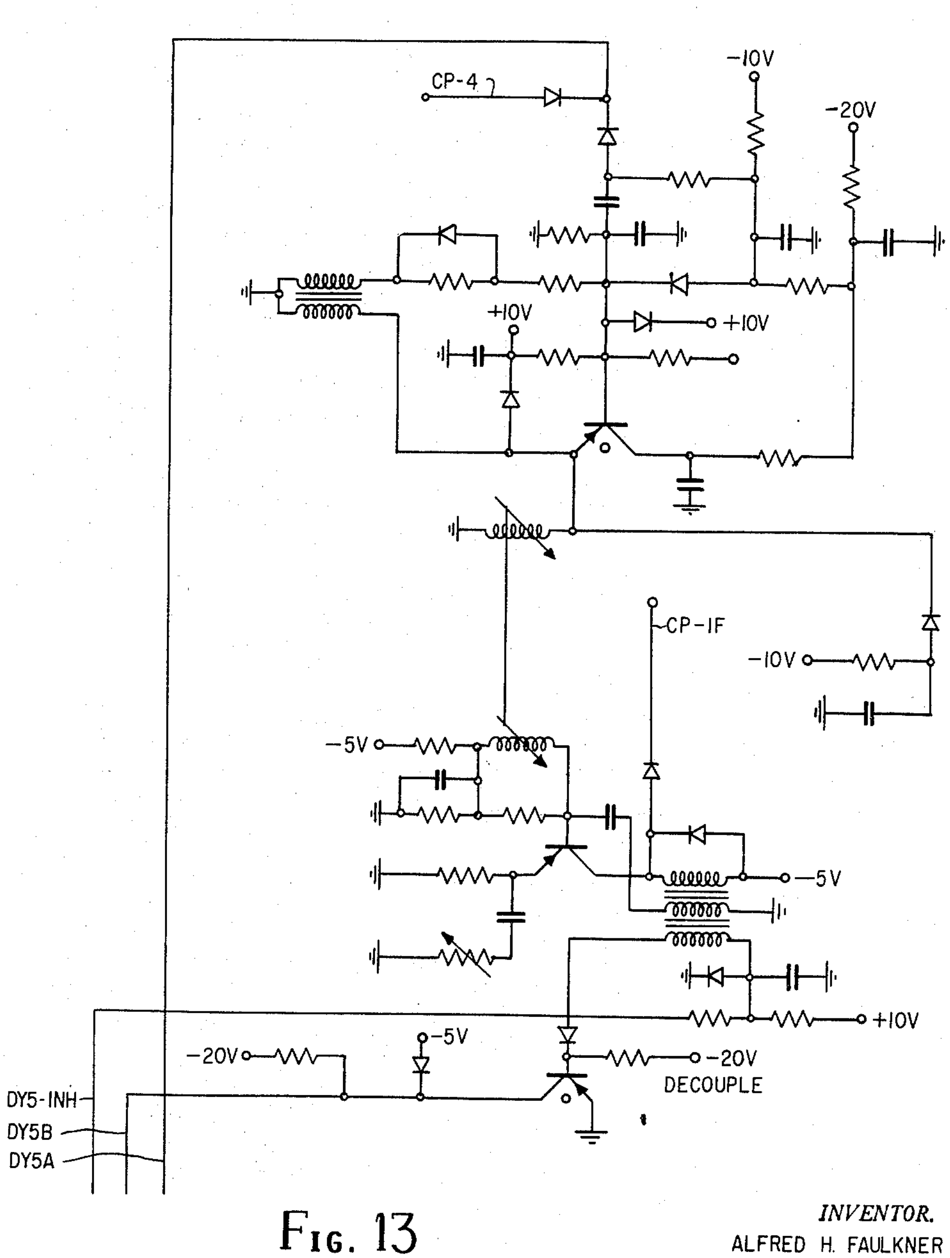

A magnetostriction delay line DY–2 provided in the line finder of each link functions primarily as a calling line memory device. The schematic diagram is shown in Fig. 12.

The magnetostriction delay line DY–2 is composed of a blocking oscillator circuit which feeds an electrical impulse to a transmitting coil which is wound around a nickel tube. The electrical pulse is transformed into a mechanical pulse at the transmitting coil and the mechanical pulse travels down the nickel tube to a receiving coil which transforms the mechanical pulse to an electrical pulse. An electrical circuit associated with the receiving coil shapes and forms the pulse.

This circuit not only delays any pulses delivered to the input thereof 20 microseconds before they reach the output but has auxiliary features as well.

An inhibit lead DY–2–INH is provided which when —5 volts is placed thereon will prevent any pulses which are in the delay line DY–2 from reaching the output lead DY2B.

Also there is a lead DY–2–HOLD which will have —10 volts placed thereon during the time a pulse is at the input to delay line DY–2 and a short time thereafter. Thus if the output pulse from delay line DY–2 is fed back to the input of delay line DY–2, lead DY2–HOLD will have −10 volts maintained thereon as long as recirculation occurs.

Also there is lead DY2C which has −10 volts placed thereon whenever there is a pulse at the input of delay line DY–2.

The blocking oscillator includes transistor 1402 and transformer 1404. A negative pulse is applied to lead CP–4 every 2 microseconds. In accordance with the operation of the link, a negative pulse may appear on lead DY2A in the time slot of a calling line. Because of diode 1412, point 1405 does not become negative until the negative pulses on leads CP–4 and DY2A appear simultaneously. When the pulses appear simultaneously, diode 1417 conducts to trigger transistor 1402 at its base electrode. The blocking oscillator generates a pulse which is transmitted from the emitter electrode of the transistor 1402 to the transmitting coil 1403, to lead DY2C, and through diode 1434 to capacitor 1436.

Capacitor 1436 will retain a negative charge if the train of pulses is continuous with a pulse interval of 20 microseconds. The resulting continuous potential appears on lead DY2–HOLD.

The pulse which is sent to the transmitting coil 1403 is there transformed into a mechanical pulse and sent down the nickel tubing. Approximately 19 microseconds later the mechanical pulse appears at the receiving coil 1427 where it is transformed into an electrical pulse. Approximately 1 microsecond delay occurs in the electrical circuit, combining with the mechanical delay to produce a 20 microsecond delay line.

Transistor 1420 is biased as a "Class A" amplifier. A negative feedback from emitter to base occurs through ground, and variable resistor 1422 can therefore be used to adjust the pulse width of the pulse received from the receiving coil 1427. The center winding of transformer 1423 and capacitor 1433 neutralize the inherent collector to base capacitance of transistor 1420.

A pulse on lead CP–1F from the "clock" circuit is fed to the collector of transistor 1420 through diode 1426 to time and shape the output pulse from transistor 1420.

When the negative pulse appears in the receiving coil 1427 the current through resistor 1420 increases and the collector of transistor 1420 swings from −5 volts toward −2 volts. If a pulse is present on lead CP–1F the collector of transistor 1420 is clamped to −5 volts and cannot swing toward −2 volts as long as the pulse on lead CP–1F remains. Therefore it can be seen that the pulse will have a time duration equal to that between two successive pulses on lead CP–1F. Thus, by proper adjustment of the pulse width, the output pulse from transistor 1420 will be 1.5 microseconds in duration.

The output pulse from transistor 1420 is fed into the primary winding of stepdown transformer 1423. Transformer 1423 transforms the 3 volt pulse in the primary winding down to a +1 volt pulse in the secondary winding. The +1 volt pulse causes diode 1430 to conduct be 1.5 microseconds in duration and −5 volts in amand transistor 1421 to cut off thereby causing a −5 volt pulse to occur at the output lead DY2B. This pulse will plitude.

An inhibit lead DY2–INH is provided by the circuit connected to the "cold" end of the secondary winding of transformer 1423. Point 1429 is clamped to ground by diode 1430 and capacitor 1431 by-passes pulses of short duration to ground. If −5 volts is applied to lead DY2–INH the potential at point 1429 will be −1.5 volts. Since the base of transistor 1421 is at ground, diode 1433 is therefore blocked. Since only +1 volt is produced in winding 5—6 of transformer 1423 in response to the 3 volt pulse at the primary winding 1—2 of transformer 1423, and an additional +0.6 volt is necessary to make the silicon diode 1433 conduct, it can be seen that diode 1433 will be blocked whenever −5 volts appears on lead DY2–INH and therefore no pulse will appear on line DY2B at this time.

Delay line DY–5 operates in exactly the same way as delay line DY–2 but as has been previously explained, it does not serve the same function as delay line DY–2. Delay line DY–5 does not have the auxiliary features of line DY2–HOLD or DY2C, but, except for this distinction, the operation is exactly the same and no detailed explanation is deemed necessary.

*D4a2. Filp-flops*

Figure 14:
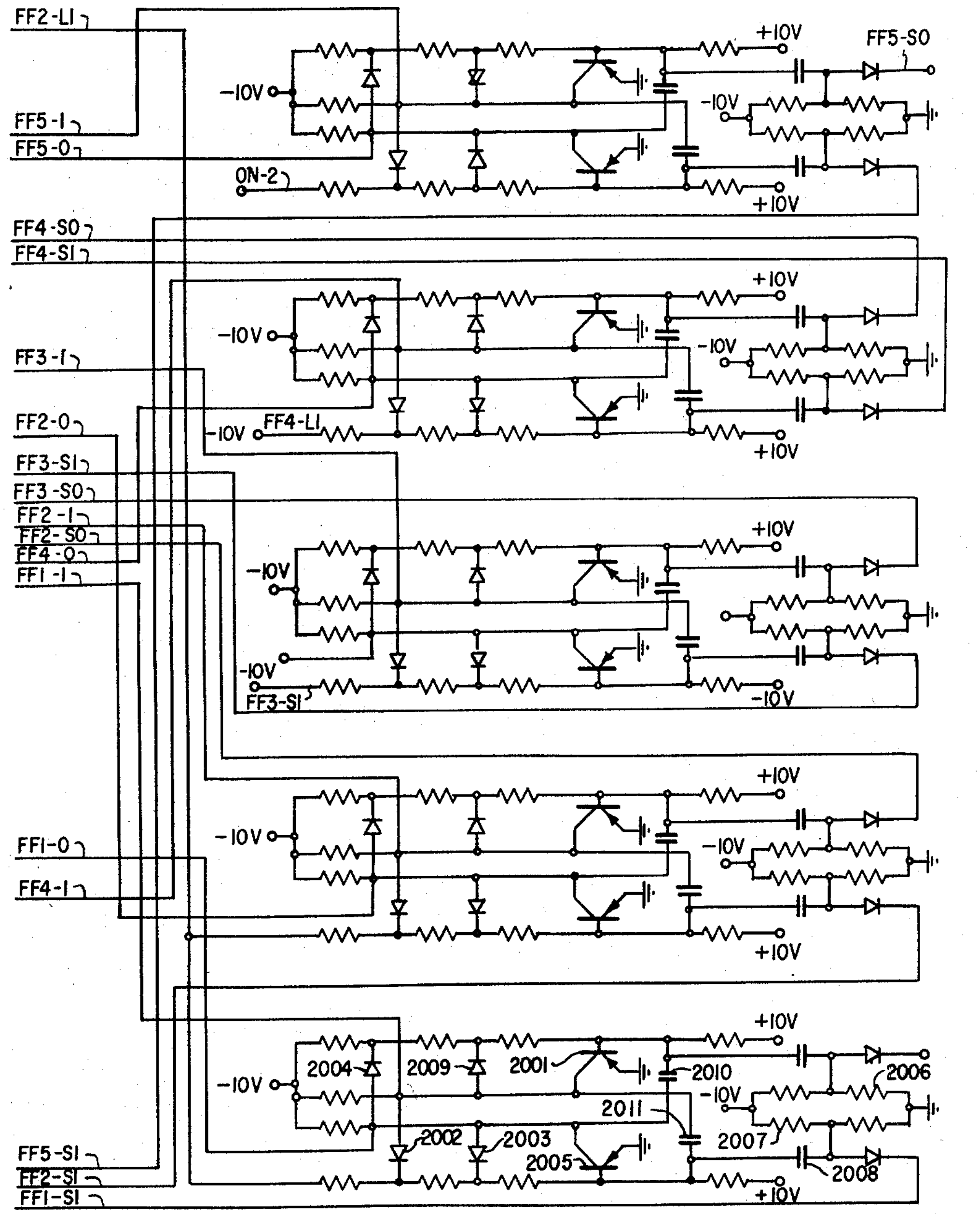

Referring to Fig. 14 there are shown the five flip-flop circuits used in each link. All five flip-flop circuits are identical in structure but not in use. One flip-flop circuit will be explained in detail and will suffice for an explanation of all five since they are identical.

The flip-flop circuits as used in this system have up to five external connections, leads S0, S1, 1, 0, and L1 which are preceded by the appropriate symbol for the flip-flop they are associated with such as FF1–S0 representing lead S0 of flip-flop 1.

Summarizing, a pulse of less than 20 microseconds in duration on lead S0 causes −10 volts to be placed on lead 0 and ground on lead 1 and a pulse of less than 20 microseconds on lead S1 causes −10 volts to be placed on lead 1 and ground on lead 0. This assumes −10 volts on lead L–1 which is the normal condition, but if −10 volts does not appear on lead L–1 then −10 volts cannot appear on lead 1. If a pulse of over 20 microseconds or thereabout appears on lead S0 or S1 then the flip-flop will reset itself at the end of the pulse.

Refer to Fig. 14, flop-flop 1, and assume that transistor 2001 is saturated and that −10 volts appears on lead FF1–L1. In this description the term "saturated" refers to a point on the collector characteristic immediately above the saturation line, that is to say, near but not quite, in the saturated condition. The flip-flop is shown in its "0" condition.

With transistor 2001 saturated, a slight negative voltage, in the order of −0.2 volt appears on the collector of transistor 2001 causing diode 2002 to conduct. The base of transistor 2005 is now maintained on a slight positive potential of approximately +1.1 volts. This causes transistor 2005 to remain cut off and therefore diodes 2003 and 2004 are biased in their reverse direction.

To set the flip-flop to its "1" condition, a −5 volt to −10 volt pulse is applied to the set 1 lead S1. A threshold of −1.5 volts is established by a voltage divider in the input circuit, which consists of resistors 2006 and 2007 to prevent stray pulses of low amplitude from triggering the flip-flop. A negative differentiated pulse is applied to the base of transistor 2005 through input capacitor 2008 as a result of the pulse or step function applied to lead S1.

Transistor 2005 saturates and lead "0" rises to approximately ground potential (actually about −0.2 volt due to the voltage drop in transistor 2005). Diode 2004 now conducts and the base of transistor 2001 rises to a positive potential. This causes transistor 2001 to cut off and lead "1" to drop to −10 volts since diodes 2002 and 2009 are biased in their reverse directions.

Diode 2003 or diode 2009 is blocked when either transistor 2005 or transistor 2001 is cut off. When either transistor conducts diode 2003 or diode 2009 prevents its associated transistor from actually saturating by sharply reducing the base current as the saturation region is approached and thus prevents an accumulation of holes in the base region which would have to be collected during the off time. These diodes, therefore, decrease the fall time of the flip-flop output pulses or step functions.

Diodes 2002 and 2004 clamp the base circuit of the cutoff transistor to the collector of the saturated transistor which is at near ground potential. This insures that only one transistor conducts at a time, resulting in the bistable operation of the circuit.

To set the flip-flop to its "0" condition, a −5 volt to −10 volt pulse or step function is applied to lead S0 causing a negative pulse to be applied to the base of transistor 2001 in the same manner as has been stated above. This pulse causes transistor 2001 to saturate and its collector to drop to approximately −0.2 volt. This near ground potential on lead "1" causes diode 2002 to conduct and the base of transistor 2005 to rise from a negative to a positive potential. This causes transistor 2005 to cut off and lead "1" to drop to −10 volts since diodes 2004 and 2003 are biased in their reverse direction.

When it is desired to restore the flip-flop to its "0" condition and maintain it in this condition regardless of pulses on lead S1 as occurs during the release of the links, lead L1 is used as follows: negative 10 volts is usually maintained on lead L1 which allows the circuit to operate as described above. When −10 volts is removed from lead L1, the base of transistor 2005 goes positive and diode 2002 is biased in its reverse direction. The base of transistor 2001 goes negative causing it to saturate. Ground will now appear on lead "1" and −10 volts on lead "0" and a pulse on lead S1 cannot cause −10 volts to appear on lead "1."

In certain applications it is desirable to have the flip-flop follow the pulses on the S1 lead when the potential on the S0 lead remains constant such as flip-flop 3. This may be accomplished by applying −8 volt pulses of approximately 20 microseconds duration or longer to lead S1. At the beginning of the pulse the flip-flop will be set to 1 and at the end of the input pulse, due to the sufficiently large reverse surge in the input capacitor, it will be set back to the "0" condition.

To prevent this action in cases where the input to lead S1 is a step function and the flip-flop is to remain set at the end of the step such as flip-flop 4, it becomes desirable to use a differentiating circuit ahead of the set lead to convert the step function into a short pulse. This assures that the flip-flop will respond only once at the beginning of the negative step voltage in response to the negative pulse on the set lead obtained by differentiation.

Since the flip-flop circuit is symmetrical, the features mentioned above also hold true for input pulses on the S0 lead when the potential on the S1 lead remains constant.

The capacitors 2010 and 2011 coupling the base and collectors of opposite transistors are used to speed up the switching times of the transistors. For example, when transistor 2005 saturates its collector goes positive causing a positive pulse to pass through capacitor 2010 to the base of transistor 2001. This pulse forces transistor 2001 to be cut off faster than it would otherwise cut off by the method previously described.

*D4a3. Amplifiers*

The amplifier A–1 connected to the output of inhibit gate IG–1 is typical of all amplifiers used in the line finder and connector of the link and shall be hereinafter described.

Amplifier A–1 consists of transistor 819, resistors 822, 823, 825 and 826, and diodes 820, 821, and 824. In the absence of an input signal the base of transistor 819 is clamped to ground through diode 824 causing the emitter of transistor 819 to float at approximately ground potential. A current of 3 milliamperes thus flows from +10 volts through resistor 826 to the emitter of transistor 819 where it divides into three branches; 1 milliampere flows through diode 820 and resistor 822 to −10 volts; 1 milliampere flows through diode 821 and resistor 823 to −10 volts; and the remaining 1 milliampere flows in the emitter collector path of transistor 819 to −10 volts.

When a −5 volt signal appears at the base of transistor 819, the emitter of transistor 819 rises to nearly −5 volts also, cutting off diodes 820 and 821. With −5 volts at the emitter of transistor 819 a current of 0.5 milliampere flows over lead 827 to the input of inhibit gate IG–2 and 4.5 milliamperes flows to +10 volts through resistor 826, thus the total collector current is 5 milliamperes. Also at this time lead 828 also rises to −5 volts although no current is drawn. It should be apparent that the value chosen for the emitter resistor 826 depends on the number of outputs controlled by the transistor 819.

*D4b. Line finder*

The detailed circuits of the line finder will now be described.

*D4b1. Gates G–1 to G–7 and Gates G–9, G–10, G–22 and G–24*

Figure 7:
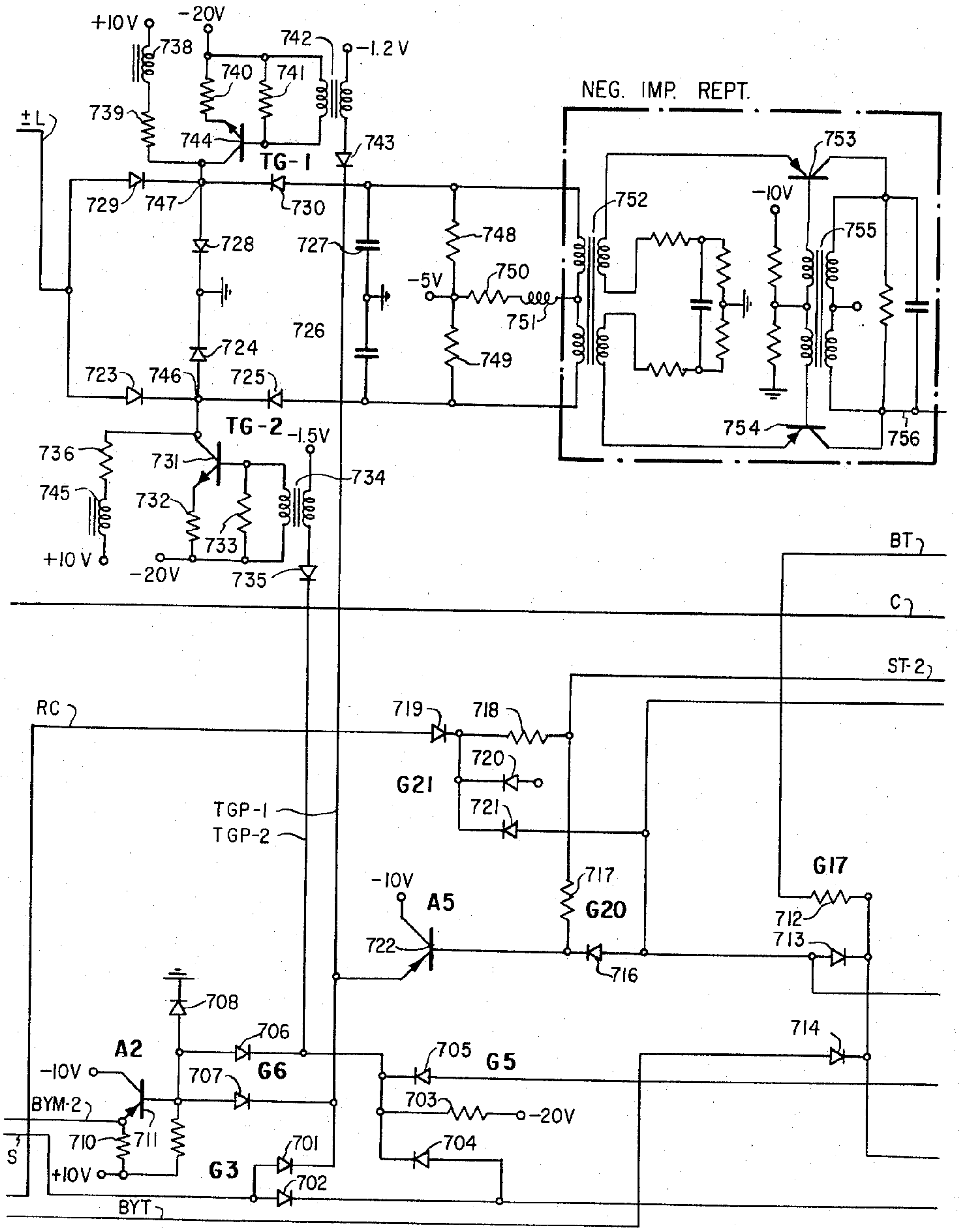
Figure 8:
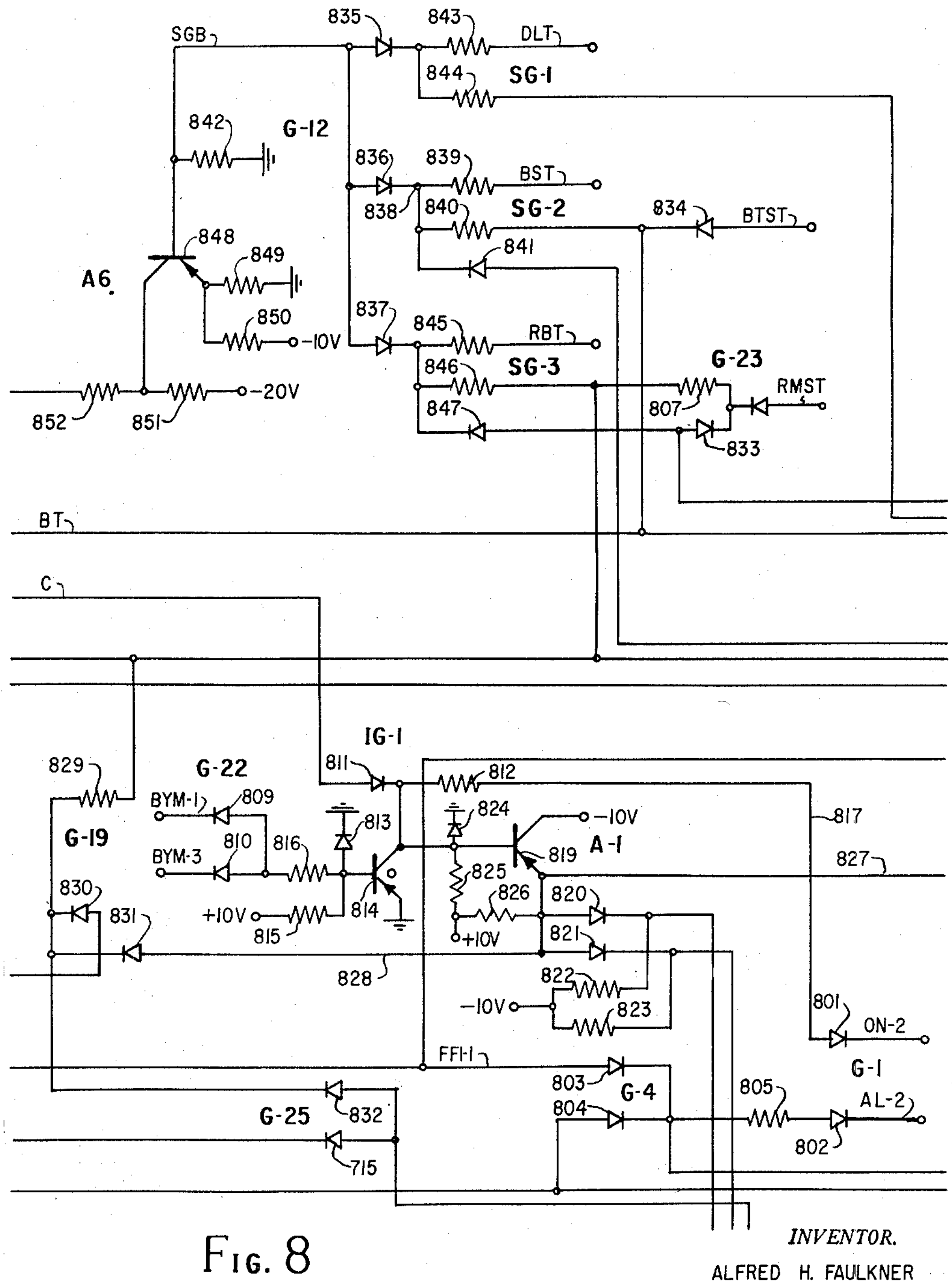
Figure 9:
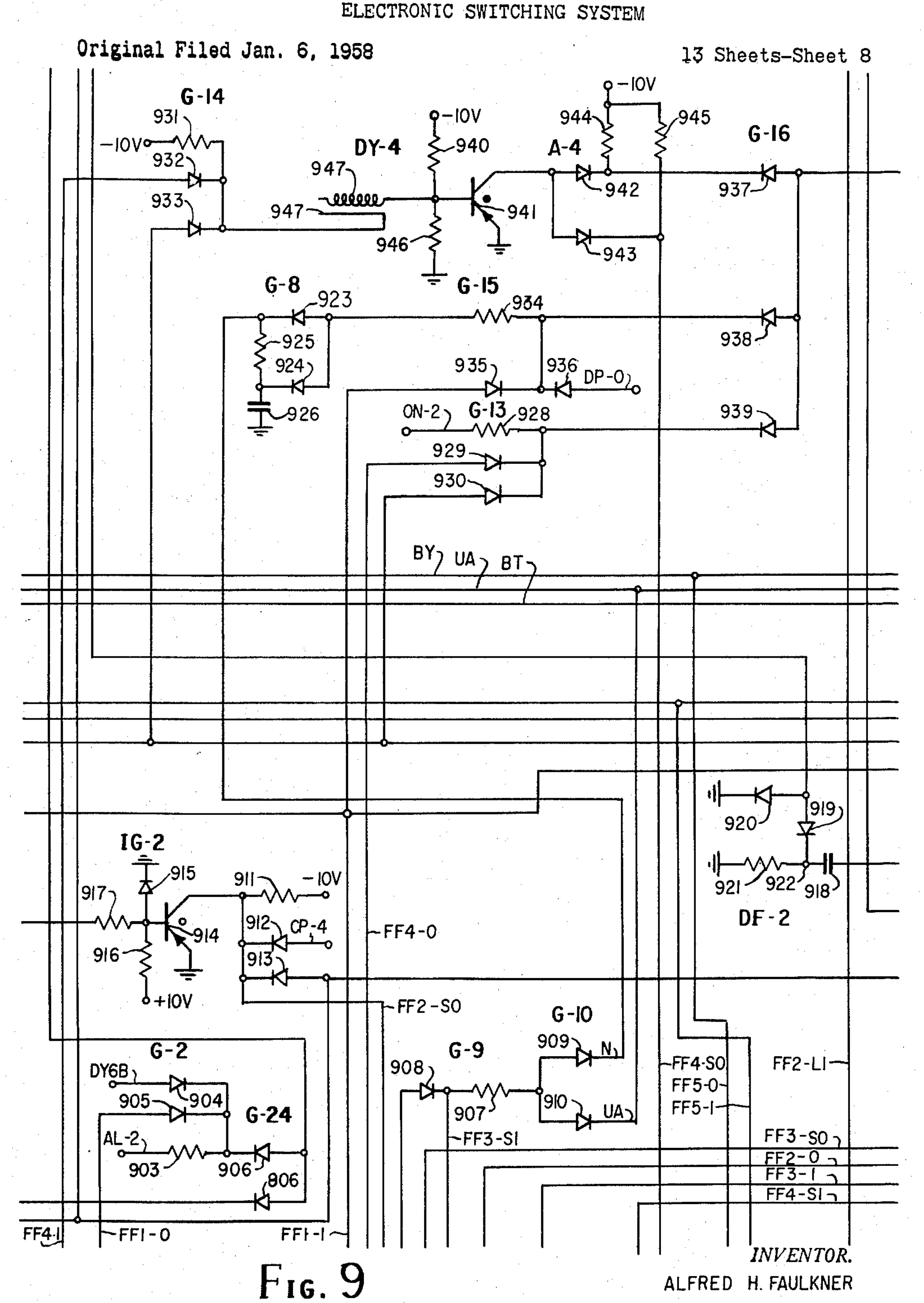
Figure 10:
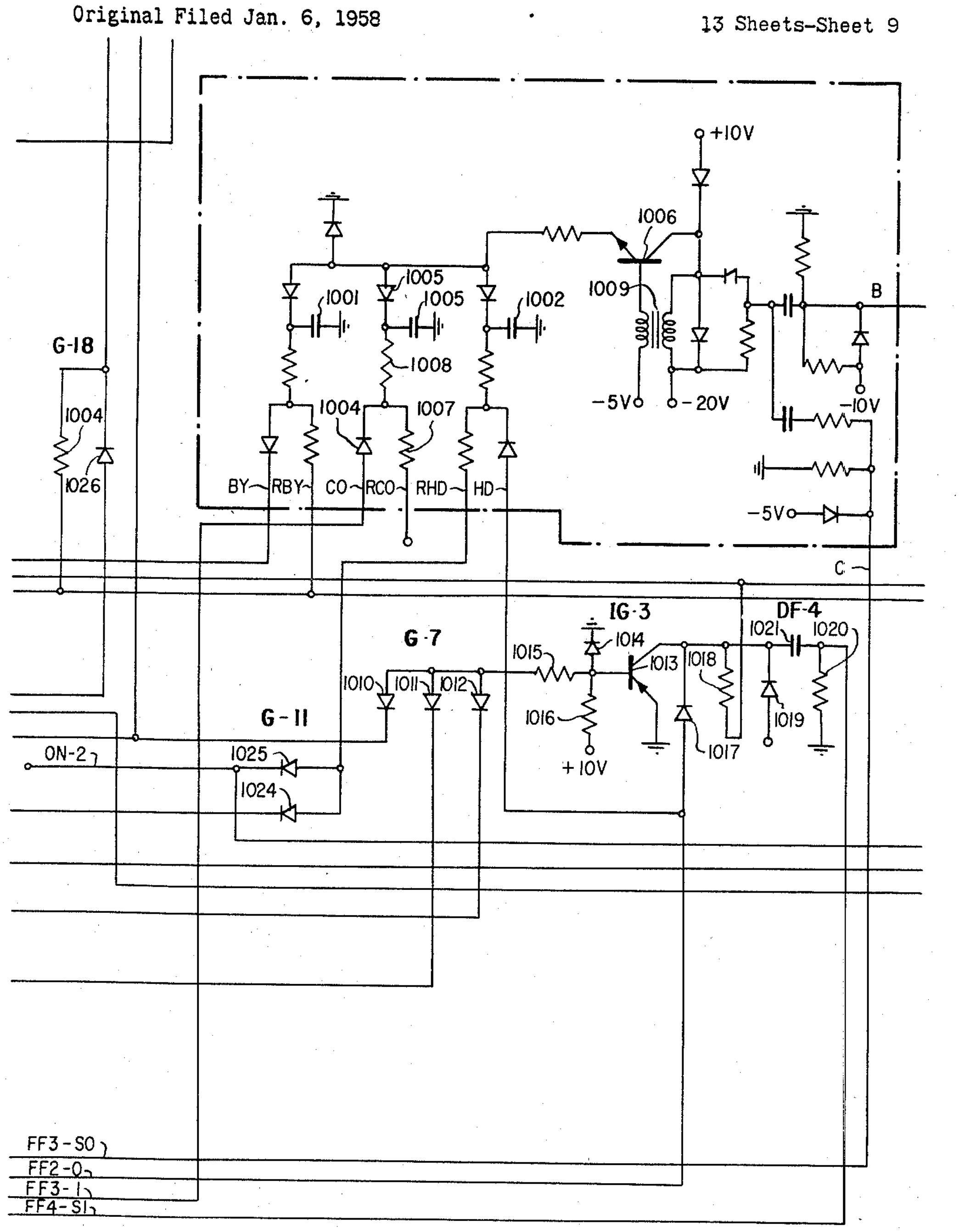

In Fig. 7, gate G–3 consists of diodes 701 and 702, gate G–5 consists of diodes 704 and 705 and resistor 703, and gate G–6 consists of diodes 706 and 707. In Fig. 8, gate G–1 consists of diodes 801 and 802, gate G–4 consists of diodes 803 and 804 and resistor 805, and gate G–22 consists of diodes 809 and 810. In Fig. 9 gate G–2 consists of diodes 904 and 905 and resistor 903, gate G–9 consists of resistor 907 and diodes 908, gate G–10 consists of diodes 909 and 910, and gate G–24 consists of diodes 806 and 906. In Fig. 10, gate G–7 consists of diodes 1010, 1011 and 1012.

*D4b2. Inhibit gates IG–1, IG–2 and IG–3*

Inhibit gate IG–1 is typical of all such gates used in this system and its detailed operation will be hereinafter explained.

Referring to Fig. 8, this gate has three inputs, lead C, lead 817 from gate G–2, and lead 818 from gate G–22, and is arranged to produce a negative signal at its output at the collector of transistor 814 only when a negative signal is present at both of the first two input leads, lead 817 and lead C, and is absent at the third or inhibit lead, lead 818.

The signal at the first input, lead 817, when present, is −10 volts and is from gate G–1. The second input, lead C, is normally at ground potential, swinging to −5 volts during a signal period. If there is no signal on inhibit lead 818 the transistor is reverse biased by the resistor 815 connected to +10 volts. Diode 813 limits the reverse voltage to a fraction of a volt. The transistor 814 is normally cut off and therefore when both lead 817 and lead C have a negative voltage thereon it can be seen that the collector of transistor 814 and hence the output of inhibit gate IG–1 in this case rises to −5 volts.

However, even if there is a signal on leads C and 817 no output will occur if there is a negative signal on the inhibit lead 818. If a −5 volt signal appears at lead 818 a forward current of 0.4 milliampere is caused to flow in the base of transistor 814 through resistor 816 thus driving transistor 814 into saturation and clamping the collector and hence the output of inhibit gate IG–1 to ground. Thus a signal on the inhibit lead 818 prevents any output even though signals are present at both leads C and 817.

Inhibit gate IG–2 consists of transistor 914, resistors 911, 916 and 917, and diodes 912, 913 and 915. It is the same as inhibit gate IG–1 except that instead of the collector voltage being supplied through one input it is permanently supplied through resistor 911 with the two input leads being supplied through diodes 912 and 913. Functionally there is no difference between inhibit gate IG–1 and inhibit gate IG–2.

Inhibit gate IG–3 consists of transistor 1013, diodes 1014 and 1017, and resistors 1015, 1016 and 1018 and it is identical in operation to inhibit gate IG–1.

*D4b3. Amplifier A–1 and A–2*

The detailed explanation of amplifier A–1 may be found in the section D4*a*3. Amplifier A–2 consists of transistor 711, resistors 709 and 710 and diode 708 and functionally performs the same as amplifier A–1 but amplifier A–2 has only one output at lead BYM–2.

*D4b4. Differentiating circuits*

Referring to Fig. 10, the differentiating circuit DF–1 consists of diode 1019, resistor 1020, and capacitor 1021 and is provided to convert step-function signals on lead FF2–0 and UA of inhibit gate IG–3 and a pulse train on input lead 1022 of inhibit gate IG–3 into a single pulse at the output lead of differentiating circuit DF–1, lead FF4–S1, for a purpose which is evident from the general description of the system.

Capacitor 1021 is normally discharged. When a line is found by the line finder circuit, −10 volts is applied to lead UA to prepare for receipt of the dial impulses. This −10 volts potential is applied through resistor 1017 to point 1023 but this point is clamped to ground by lead FF2–0 at this time. Upon receipt of a dial impulse lead FF2–0 switches to −10 volts for the duration of the impulse which can be seen by reference to the general explanation of the system.

Since the operation of the flip-flop controlling lead FF2–0 is initiated by an output pulse obtained from lead DY2B through gate G–7, this lead will always have a negative signal on it at the time that lead FF2–0 swings negative. Lead DY2C through gate G–7 swings negative shortly after lead DY2B swings negative, and remains negative until the expiration of the succeeding time slot. Thus transistor 1013 is conducting at this time and it blocks the signal at point 1023 until the expiration of the time slot following that in which the switch is made, to insure that the output of differentiating circuit DF–1 coincides with the start of a subsequent time slot.

Following the expiration of the pulse on lead DY2C transistor 1013 is cut off and point 1023 swings negative permitting current to flow from −10 volts at lead UA through resistor 1018 and capacitor 1021 to the input lead FF4–S1 of flip-flop FF–4. Within 2 microseconds this capacitor charges to a point where diode 1019 conducts and interrupts the flow of current over lead FF4–S1. Capacitor 1021 continues to charge at a slower rate through resistor 1020.

The flip-flop FF–4 controls gate circuits in the recirculating path of delay line DY–5, and flip-flop FF–4 causes a 2 microsecond electrical delay line DY–4 to be inserted in the recirculating path when flip-flop FF–4 is set to position 1, as has been explained in the general explanation of the system.

The next output pulse from delay line DY–4 is then delayed 2 microseconds, displacing the succeeding output pulse from delay line DY–2 one time slot from its previous position. The delayed pulse also resets flip-flop FF–4, hence only one such shift in time position takes place. It is imperative that flip-flop FF–4 be operated only once during a dial impulse. The rapid discharge of capacitor 1021 during the setting of flip-flop FF–4 to position 1 provides such assurance.

It will be noted, however, that point 1023 does not remain at −5 volts continuously, instead it drops back to ground each time that transistor 1013 conducts in response to a pulse on the inhibit lead, lead 1022. Due to the fact that the duty cycle of the pulses is very low, point 1023 is at −5 volts far longer than it is at ground, hence capacitor 1021 never discharges sufficiently during such pulses to again operate flip-flop FF–4.

From the above description it can be seen that it would be undesirable to operate flip-flop FF–4 while a pulse is being recirculated from the output of delay line DY–5 to the input of delay line DY–5 due to the likelihood of mutilating the pulse. In order to prevent such an occurrence the output pulse from delay line DY–5 on lead DY5B is fed to the inhibit input of inhibit gate IG–3 through gate G–7 to block transmission of a pulse through differentiating circuit DF–1 until the recirculating operation has been completed.

The differentiating circuit DF–2 consists of diodes 919 and 920, resistor 921, and capacitor 918. The function of differentiating circuit DF–2 is quite different with respect to the function of differentiating circuit DF–1.

When the link circuit is idle, lead N of the sequence switch circuit is connected to −10 volts and capacitor 918 is charged to 10 volts. Diode 919 is then non-conducting. When the link circuit is in use lead N is returned to ground. Point 922 swings positive to nearly +10 volts and gradually returns to ground as capacitor 918 charges through resistor 921.

During release of the link, lead N is returned to −10 volts. A −10 volt transient is then transmitted through diode 919 to lead DY2–INH of delay line DY–2 to interrupt the circulating pulse in delay line DY–2.

The transient is long enough to place delay line DY–2 in an idle condition, so that it is ready to again circulate pulses when the allotter circuit again selects the corresponding link for use.

*D4c. Connector*

The detailed circuits of the connector will now be described.

*D4c1. Gate G–8*

This gate G–8 (Fig. 9) consists of capacitor 926, resistor 925, and diodes 923 and 924 and is a special purpose circuit necessitated by the fact that the outputs of the sequence switch circuit do not overlap. The input to delay line DY–5 is controlled by gates G–8 and G–13. Gate G–8 is enabled by the sequence switch when the sequence switch is in its normal position and −10 volts appears on lead N. Gate G–13 which is explained later is enabled when the sequence switch is in its off-normal position, that is when lead ON has −10 volts thereon.

When the sequence switch advances from its normal position to its off-normal position there is a brief period when −10 volts does not appear on either lead N or lead ON. Capacitor 926 which is charged through resistor 925 while the sequence switch is in its normal position and lead N has −10 volts thereon, feeds the output lead 927 through diode 924 for an appreciable interval after −10 volts is removed from lead N in order to bridge this mentioned gap and thereby prevent false operation of delay line DY–5.

*D4c2. Gates G–11, G–13 to G–21, G–23 and G–25 and Diodes 719, 808 and 834*

In Fig. 7 gate G–17 consists of resistor 712 and diodes 713, 714 and 715; Gate G–20 consists of diode 716 and resistor 717; and gate G–21 consists of resistor 718 and diodes 720 and 721. Diode 719, along with similar diodes of other links, froms part of an "OR" gate. In Fig. 8, gate G–19 consists of diodes 830, 831 and 832 and resistor 829; gate G–23 consists of resistor 807 and diode 833 and gate G–25 consists of diodes 715 and 832. Diode 808 is an isolating diode; and diode 834, along with similar diodes of other links, forms part of an "OR" gate. In Fig. 9, gate G–13 consists of resistor 928 and diodes 929 and 930; gate G–14 consists of resistor 931 and diodes 932 and 933; G–15 consists of resistor 934 and diodes 935 and 936; and gate G–16 consists of diodes 937, 938, and 939. In Fig. 10 gate G–11 consists of diodes 1024 and 1025; and gate G–18 consists of resistor 1027 and diode 1026.

*D4c3. Amplifiers A–4 and A–5*

Amplifier A–4 (Fig. 9) consists of transistor 941, resistors 940, 944, 945, 946, and diodes 942 and 943. This amplifier is much the same as amplifier A–1, explained in section D4*a*3, except that the output is taken from the collector of transistor 941 in this case. Amplifier A-5 (Fig. 7) consists of transistor 722 and is self-explanatory.

*D4c4. Delay line DY-4*

This delay line DY-4 (Fig. 9) consists of a coil 947 and a copper shield 948. The copper shield is at the same potential as point 949 which is the output of "and" gate G-14. A capacitive effect occurs between the copper shield 948 and the coil 947. Therefore, if the potential of the copper shield 948 changes, a change will occur in the coil. This change causes a pulse to travel the length of coil 947 in one microsecond and at the open-circuited end that pulse is reflected and returns to the other end of coil 947 in another microsecond. Thus a pulse delayed two microseconds emerges from the coil 947 and that is fed to the input of amplifier A-4.

*D4c5. Sequence switch driver*

This circuit performs the function of generating −10 volt pulses which are delivered to the sequence switch to advance it. The performance of the sequence switch driver circuit has been previously described in the general explanation of the system and the detailed description of the internal structure of the sequence switch driver circuit follows.

Referring to Fig. 10, it can be seen that there are three inputs to the sequence switch driver, namely a changeover input RC0 and C0, a hold input RHD and HD, and a busy test input RBY and BY. As long as the potential on one of the two input leads of any of the inputs is positive with respect to the other, the ungrounded side of the associated timing capacitor, either capacitor 1001, 1002, or 1003 will be at the more positive potential of the two in its steady state condition. The input signals to this circuit are pulses or step functions that are at either ground or −10 volt potential.

If, for example, −10 volts is on lead RC0 and ground is on lead C0, the diode 1004 will conduct and timing capacitor 1003 will be in a discharged condition since both of its plates will be at essentially ground potential. Diode 1005 coupling capacitor 1003 to the blocking oscillator associated with transistor 1006 is thereby blocked.

When −10 volts appears on both leads RC0 and C0, diode 1004 is cut off and the timing capacitor 1003 charges through resistor 1007 and resistor 1008. The charging time is determined by the values of the timing capacitor 1003 and the series resistors 1007 and 1008.

The negative charge on capacitor 1003 builds up until approximately −5 volts is reached and then the blocking oscillator transistor 1006 conducts and the low impedance path of the emitter circuit causes a rapid discharge. The transformer 1009 causes the base of transistor 1006 to go more positive and transistor 1006 to continue conducting until the timing capacitor is completely discharged. This action results in a negative 5 volt pulse on lead FF3-S0 and a negative 10 volt pulse on lead IN which is the input lead to the sequence switch.

If −10 volt still remains on leads RC0 and C0 the timing capacitor again charges and another pulse is generated in the same manner. This process continues until −10 volts is removed from either or both leads RC0 and C0.

The hold input and the busy test input operate the same as the change-over circuit, the only difference being in the time required to charge the timing capacitors 1001 and 1002.

The change-over timing circuit allows the input gate to be opened and closed at dial pulse rates without generating an output pulse, however, the post digital step function causes an output pulse to be generated which causes the sequence switch to advance, as has been previously described. Only one pulse is generated at this time since the −10 volts is removed from lead C0, as has been previously stated.

If the called line is idle, −10 volts appears simultaneously on the busy test leads RBY and BY as has been previously stated, and another output pulse is generated to advance the sequence switch which closes the busy test input gate to allow only one pulse to be generated by the sequence switch driver at this time.

After the call is completed and the link is being released, −10 volts appears at lead RHD and HD and two pulses are generated to drive the sequence switch to its home or normal position, as has been stated.

*D4c6. Sequence switch*

The sequence switch circuit has five steady state conditions and it is in its home or normal position when −10 volts appears on lead N. An input pulse on lead IN causes the −10 volts condition to advance to lead UA and a subsequence pulse on lead IN will cause the −10 volt condition to advance to lead BT and so on until it reaches its home position again and the cycle has been completed. When the −10 volt condition is advanced to lead UA there is also a −10 volt condition caused on lead ON and that condition remains there as long as the circuit is not in its home or normal position. A detailed description follows.

Figure 11:
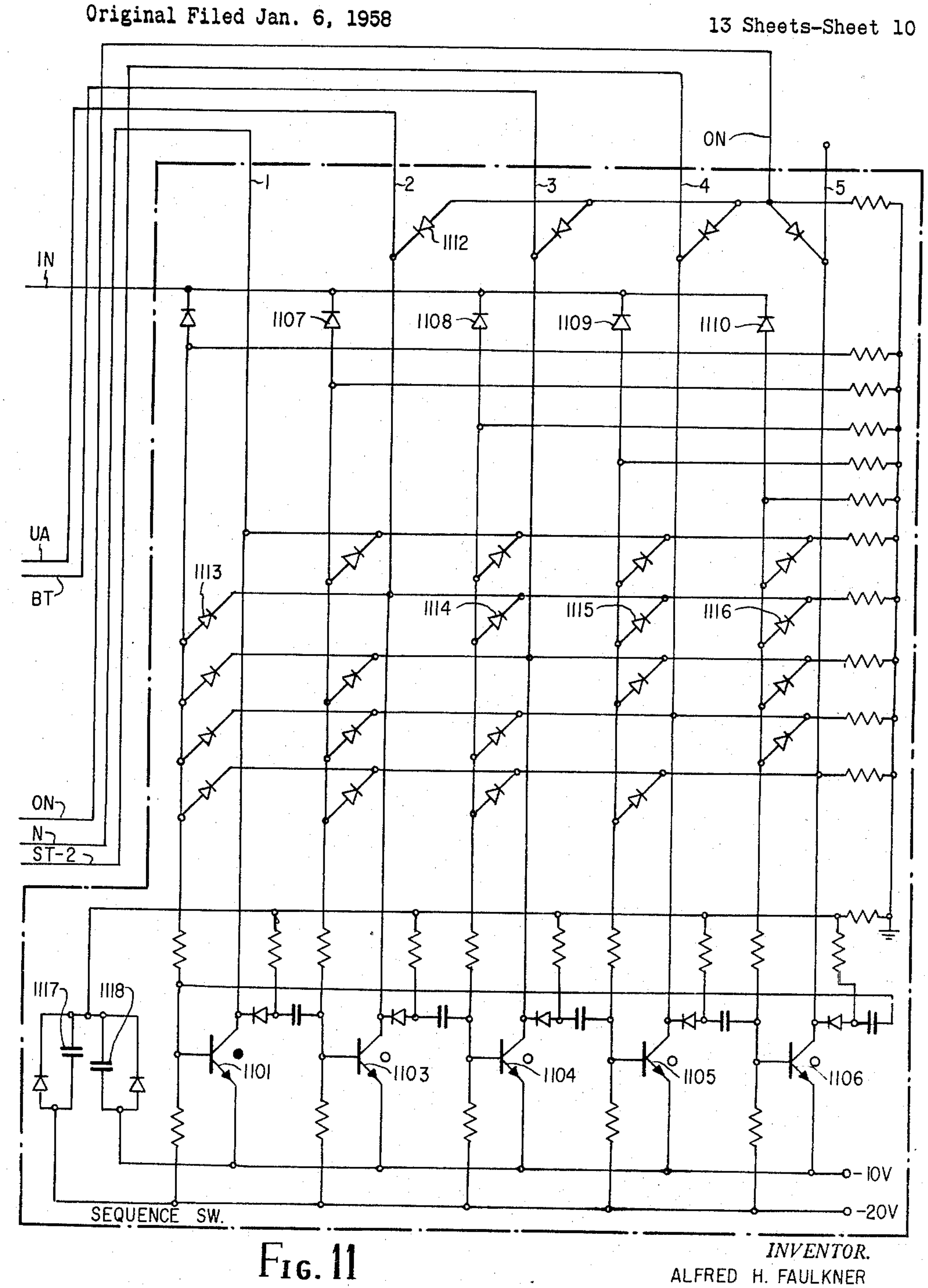

Referring to Fig. 11, assume that transistor 1101 is saturated as it is when the sequence switch is in its home position. The negative potential on the collector of transistor 1101 causes all diodes connected to the collector to be cut off.

A negative 10 volt pulse approximately 80 microseconds in duration on the input lead IN causes transistor 1101 to drop below −10 volts at its base, thereby cutting it off. The collector of transistor 1101 therefore rises from approximately −10 volts to near ground potential.

Capacitor 1102 discharges and charges in the opposite direction thereby creating a positive pulse which is applied to transistor 1103 at its base causing it to saturate. This pulse does not affect the other stages associated with transistors 1104 to 1106 since the diodes 1108 to 1110 connecting lead IN with the base circuits of each transistor are cut off.

Upon saturation, the collector of transistor 1103 drops to a potential of approximately −10 volts. A negative direction pulse is thereby transmitted through capacitor 1111 to transistor 1104 at its base but it is already cut off so the negative pulse has no effect.

The negative potential on the collector of transistor 1103 of approximately −10 volts causes off normal lead coupling diode 1112 to conduct thereby dropping the potential on lead ON-2 from ground to approximately −10 volts. At the same time diodes 1113 to 1116 conduct thereby maintaining the base voltages on all but the saturated transistor 1103 at a sufficiently negative potential to assure that all other stages are cut off. As can be seen, the input lead IN is also blocked from all but transistor 1103.

It can now be seen that the first pulse on input lead IN causes −10 volts to be placed on lead ON and lead UA.

When a second pulse occurs a similar action takes place and transistor 1103 is cut off and transistor 1104 saturates. Therefore −10 volts is removed from lead UA and ground placed thereon, and ground is removed from lead BT and −10 volts placed thereon. It can also be seen that lead ON still has −10 volts thereon and shall continue to have −10 volts thereon until the sequence switch is in its home position, that being when transistor 1101 is saturated.

A third pulse on input lead IN will cause −10 volts to be removed from lead BT and placed on lead ST-2 in the manner described.

A similar switching will occur with the next pulse on lead IN but the fifth position is not used in this system and instead of one pulse on lead IN two pulses occur thereby advancing the sequence switch through its fifth position back to its first position where −10 volts appears on lead N. As can be observed there is no diode similar to diode 1112 to place −10 volts on lead ON thereby removing −10 volts from lead ON and placing ground thereon. Thus the cycle of operation of the sequence switch has been completed.

When power is first applied to this circuit, or when one voltage is removed and again applied to the circuit, it becomes necessary to provide a means for preventing more than one stage from saturating at a time and causing a free running action. Capacitors 1117 and 1118 are provided for this purpose. When power is applied, a negative pulse through capacitors 1117 and 1118 cause a negative pulse to be applied to the base of all transistors through the coupling capacitors 1102, 1111, etc., causing all transistors to cut off. At the end of the pulse one transistor saturates and the circuit is in its operating condition.

*D4d. Link transmission circuit*

The detailed circuits of the link transmission circuit will now be described, with reference to Figs. 7 and 8.

*D4d1. Transmission gates TG–1 and TG–2*

Transmission gate TG–1 comprises transistor 744, diodes 729 and 730, storage condenser 727 and associated bias elements; and gate TG–2 comprises transistor 731, diodes 723 and 725, storage condenser 726, and associated bias circuits. Input control pulses are supplied to gate TG–1 from lead TGP–1 through diode 743 and transformer 742, and to gate TG–2 from lead TGP–2 through diode 735 and transformer 734. The operation is similar to that described in section D2 for gate TG–A in the line circuit.

*D4d2. Negative impedance repeater*

The negative impedance repeater which is shown in detail in Fig. 7 performs the function of amplifying the signals on capacitor 727 and 726, thereby compensating for the transmission loss of the system.

The active (feed back) portion of a repeater of this kind is usually referred to as a "negative impedance converter" because, in effect, it converts the positive impedance of "gain adjusting network" 756 into a negative impedance. This negative impedance is inserted in series with the positive impedance of the line, i.e., the transmission path of the link, by the coupling afforded by input transformer 752. The voice frequency gain characteristic of the repeater is determined by this impedance.

The negative impedance repeater shown in Fig. 7 is of the series type (open-circuit stable type) and is generally similar to the series type repeater described in the article "Two New Negative-Impedance Voice-Frequency Repeaters" by R. P. Dimmer, which appeared in the December 1955 issue of the Automatic Electric Technical Journal, except that a somewhat different feed back arrangement is used. Briefly the negative impedance repeater, Fig. 7, operates as follows:

A signal from the calling line appearing on capacitor 727 is coupled to the emitters of transistors 753 and 754 in push-pull fashion. Practically all the emitter current going into either transistor, depending on whether the positive or negative portion of the input signal is received, flows out of its collector into the load, developing a voltage across it. This voltage is cross-coupled by transformer 755 back to the base of the opposite transistor, and to the input terminals practically undiminished because of the low impedance of the operating transistor between emitter and base. Therefore, the voltage back to the input is practically the negative of the voltage across the load, and the negative of the load impedance appears at the input. The base voltages appear at the emitters because the transistors behave essentially like cathode followers. Note that the current enters the first transistor and leaves from the emitter of the second transistor, and vice versa, so that this repeater is acting essentially as a generator.

*D4d3. Supervisory signal gates*

Gate SG–2 is typical of this class of circuits which are employed to connect a tone signal source to the speech transmission circuit at appropriate times. A high degree of attenuation is required when the tone signal is not in use to prevent objectional background noise in the transmission circuit.

The gate SG–2 chosen by way of example consists of resistors 839 and 840 and diode 841 and is a form of an "and" circuit and is used to return busy tone to a calling subscriber in the event the called party's line is in use. This condition is indicated by −10 volts placed on lead BT by the sequence switch and on lead FF5–1 by flip-flop FF–5. The busy tone generator, producing a signal level in the order of two volts, is connected to lead BST and is returned to ground at the source.

Normally both leads BT and FF5–1 are at ground potential. When this occurs the tone signal at point 838, the output of gate SG–2, is attenuated to about 0.5 volt. Since the output of gate G–12 is connected to lead SGB which has a potential of about −1 volt normally placed thereon, diode 836 of gate G–12 is reverse biased hence the tone signal transmitted to lead SGB is negligible. Furthermore, this lead connects to the input of a normally cut-off transistor amplifier in the transmission circuit amplifier A–6.

With −10 volts on both leads BT and FF5–1 the point 838 rises to an average value of about −5 volts, being limited to this value by a resistor 842 which is connected to point 838 through diode 836. The tone signal is superimposed on the −5 volt output and is fed to the amplifier A–6 circuit. Amplifier A–6 is turned on by the change in D.C. level on lead SGB and amplifier A–6 amplifies the superimposed tone signal and feeds it to the transmission circuit.

Gate SG–1 consists of resistors 843 and 844 and its operation is very similar to the operation of gate SG–2. Gate SG–3 consists of resistors 845 and 846 and diode 847 and is also very similar to the operation of gate SG–2.

*D4d4. Gate G–12*

Gate G–12 is an "or" gate and consists of diodes 835, 836 and 837.

*D4d5. Amplifier A–6*

Amplifier A–6 consists of transistor 848 and resistors 842, 849, 850, 851, and 852. As is stated in the section D4d3, lead SGB and hence the base of transistor 848 has approximately −1 volt normally thereon because of the slight reverse current in the base circuit. Therefore the transistor can be considered to be cut off.

When either gate SG–1, SG–2, or SG–3 passes a supervisory signal thereto, approximately −5 volts appears on lead SGB, with a supervisory signal imposed thereon. This signal is therefore amplified since it turns transistor 848 on and applied to the gain adjusting network of the negative impedance repeater (shown at the right hand end of the dot-dash line rectangle so labeled in Fig. 7). From the negative impedance repeater the signal is impressed on the condenser 727 of the transmission circuit and from there transmitted to the calling party.

What is claimed is:

1. In a time division multiplex telephone system; a plurality of substations; a sequence switch driver having a plurality of input circuits and an output circuit; a sequence switch having an input circuit and a plurality of output circuits, said input circuit connected to the output circuit of said sequence switch driver; means in said sequence switch for transferring an output signal to successive ones of said output circuits responsive to a signal received over said connection; a transmission circuit; a normally closed first gate circuit connected to said transmission circuit and to one of said sequence switch output circuits; a source of dial tone connected to said first gate circuit; means operated responsive to the initiation of a call at a calling one of said substations for transmitting a first control pulse over one of said sequence switch driver input circuits, thereby operating said sequence switch driver and said sequence switch, and causing said output signal to be transferred to said one sequence switch output circuit, said first gate circuit thereby opened to cause said dial tone to be transmitted to said calling substation by way of said transmission circuit; a normally closed second gate circuit connected to said transmission circuit, to a second of said sequence switch output circuits, and to a busy condition marking circuit in each of said substations; a source of busy tone connected to said second gate circuit; said last-mentioned means reoperated responsive to the termination of transmission of digital impulses from said calling substation to transmit a second pulse over said one input circuit thereby operating said sequence switch driver and said sequence switch and causing said output signal to be transferred from said one sequence switch output circuit to said second sequence switch output circuit, said second gate circuit thereby opened only if the called line is marked busy, whereupon busy tone is transmitted to said calling substation by way of said transmission circuit.

2. In a time division multiplex telephone system the combination as claimed in claim 1, further including a normally closed third gate circuit connected to said transmission circuit and to a third of said sequence switch output circuits; a source of ring-back tone connected to said third gate circuit; and means responsive to absence of busy condition of said called substation for simultaneously transmitting said output signal and a second control pulse over a second of said sequence switch driver input circuits, thereby operating said sequence switch driver and said sequence switch and causing said output signal to be transferred from said second output circuit to said third output circuit, said third gate circuit thereby opened to cause said ring-back tone to be transmitted to said calling substation by way of said transmission circuit.

3. In a time division multiplex telephone system the combination as claimed in claim 2, further including circuit means for closing said third gate circuit to thereby terminate transmission of said ring back tone, said circuit means operated responsive to an answer signal of said called substation; and means operated responsive to the termination of a call at the calling and called substations, for transmitting a third control pulse over a third of said sequence switch driver input circuits, thereby operating said sequence switch driver and said sequence switch and causing said output signal to be transferred to the last of said sequence switch output circuits, thereby conditioning said sequence switch for another call.

No references cited.